United States Patent [19]
Gartung et al.

[11] Patent Number: 5,915,257
[45] Date of Patent: Jun. 22, 1999

[54] CROSS TAB ANALYSIS AND REPORTING METHOD

[75] Inventors: Daniel L. Gartung, Sunnyvale; Yorgen H. Edholm, Palo Alto; Kay-Martin Edholm, Sunnyvale; Kristen N. McNall, Mountain View; Karl M. Lew, Sunnyvale, all of Calif.

[73] Assignee: Brio Technology, Inc., Palo Alto, Calif.

[21] Appl. No.: 08/772,830

[22] Filed: Dec. 24, 1996

Related U.S. Application Data

[63] Continuation of application No. 08/320,635, Oct. 11, 1994, abandoned.

[51] Int. Cl.⁶ ............... G06F 17/30
[52] U.S. Cl. ............... 707/503
[58] Field of Search ............... 395/326, 333–334, 395/339, 766–769, 785, 764–765, 611–615; 707/503

[56] References Cited

U.S. PATENT DOCUMENTS

| | | | |
|---|---|---|---|
| 5,359,724 | 10/1994 | Earle ............... | 707/205 |
| 5,406,477 | 4/1995 | Harhen ............... | 364/578 |
| 5,442,784 | 8/1995 | Powers et al. ............... | 707/102 |
| 5,555,354 | 9/1996 | Strasnick et al. ............... | 345/427 |
| 5,604,854 | 2/1997 | Glassey ............... | 707/503 |

OTHER PUBLICATIONS

Brio Technology, Inc., *DataPivot, Version 1.0, Reference and User Guide*, Palo Alto, California, 1991.

Brio Technology, Inc., *DataPivot, Version 1.1, Reference and User Guide*, Palo Alto, California, 1991, 1992.

*Primary Examiner*—Anton Fetting
*Attorney, Agent, or Firm*—Haverstock & Owens LLP

[57] ABSTRACT

A method of and apparatus for preparing and modifying cross-tabulation analysis and reporting utilizes a data structure for storing aggregate data, gathered or input from a stream of data records. The data structure stores the aggregates of the data values, so that as cross-tab reports are generated, access to the original stream of data records is not necessary. Preferably, a tree-type data structure is utilized. The tree-type data structure is arranged relative to a root. The root of the tree is the first node in the tree. It has no parent node and no sibling nodes. Directly related to the root of the tree are labels of a first level. Labels of a second level and then labels of succeeding levels may follow, as required. Each level includes multiple nodes corresponding to the arrangement of the data. Each node has an array of accompanying cell in which the aggregates of the data values are stored. As the cross-tab report is modified, the tree-type data structure is also correspondingly modified by either changing the pointers between levels and nodes or by rearranging the levels. The aggregate values are then updated accordingly. A cross-tree is also maintained with the same structure as the main tree except that the cross-tree does not include the side label levels or nodes. When the labels of the cross-tab report are rearranged or removed, preferably the data structure is modified in place. Alternatively, a separate data structure may be constructed from the original data structure.

19 Claims, 10 Drawing Sheets

Microfiche Appendix Included
(4 Microfiche, 185 Pages)

CROSS TAB ANALYSIS AND REPORTING METHOD

This is a file wrapper continuation of application Ser. No. 08/320,635 filed on Oct. 11, 1994 (abandoned).

MICROFICHE APPENDIX

A z-interface library for the present invention is included as a microfiche appendix in Appendix A. Appendix A includes 2 microfiche with 88 frames. A software code listing in the C language for the present invention is included as a microfiche appendix in Appendix B. Appendix B includes 2 microfiche with 97 frames.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the field of cross-tabulation analysis and reporting of tabular-styled data on a two dimensional array. More particularly, the present invention relates to the field of rapidly interchanging the compilation and presentation of data resulting from moving a label between a row and a column.

BACKGROUND OF THE INVENTION

As the amount of data available on personal computers increases, the need for rich, fast and powerful analysis tools has become critical. A standard analysis tool currently available and commonly used is a spreadsheet. The classical spreadsheet is a good tool to do formulaic analysis of fixed size data. However, when the data is of varying size, or if cross-tabulation based analysis is needed, the classical spreadsheet is inadequate.

Current spreadsheets typically include the ability to cross-tabulate or pivot rows or columns of a report. A spreadsheet add-on tool entitled DataPivot® was the pioneer of this capability to restructure data and reports. DataPivot® is a registered trademark of Brio Technology, Inc. of 444 Castro Street, Suite 700, Mountain View, Calif. Other major spreadsheet programs have also now added this ability to cross-tabulate or pivot data. The DataPivot Reference and User's Guide published by Brio Technology, Inc. of 444 Castro Street, Suite 700, Mountain View, Calif. is attached hereto as Appendix C.

Cross-tabulation analysis allows a user to dynamically restructure data. Consider as an example the rows of source data contained in Table 1:

TABLE 1

Example Data For Reports

| Year | Quarter | Winery | Grape | Cases Sold |
|------|---------|--------|-------|------------|
| 1991 | Q1 | Beaulieu | Cabernet Sauvignon | 450 |
| 1991 | Q2 | Beaulieu | Cabernet Sauvignon | 550 |
| 1991 | Q3 | Beaulieu | Cabernet Sauvignon | 575 |
| 1991 | Q4 | Beaulieu | Cabernet Sauvignon | 650 |

TABLE 1-continued

Example Data For Reports

| Year | Quarter | Winery | Grape | Cases Sold |
|------|---------|--------|-------|------------|
| 1991 | Q1 | Beaulieu | Cabernet Sauvignon | 320 |
| 1991 | Q2 | Beaulieu | Cabernet Sauvignon | 325 |
| 1991 | Q3 | Beaulieu | Cabernet Sauvignon | 330 |
| 1991 | Q4 | Beaulieu | Cabernet Sauvignon | 350 |
| 1991 | Q1 | Beaulieu | Cabernet Sauvignon | 350 |
| 1991 | Q2 | Beaulieu | Cabernet Sauvignon | 360 |
| 1991 | Q3 | Beaulieu | Cabernet Sauvignon | 370 |
| 1991 | Q4 | Beaulieu | Cabernet Sauvignon | 375 |
| 1991 | Q1 | Beaulieu | Cabernet Sauvignon | 230 |
| 1991 | Q2 | Beaulieu | Cabernet Sauvignon | 235 |
| 1991 | Q3 | Beaulieu | Cabernet Sauvignon | 240 |
| 1991 | Q4 | Beaulieu | Cabernet Sauvignon | 260 |
| 1992 | Q2 | Beaulieu | Cabernet Sauvignon | 625 |
| 1992 | Q4 | Beaulieu | Cabernet Sauvignon | 670 |
| 1992 | Q1 | Beaulieu | Cabernet Sauvignon | 310 |
| 1992 | Q2 | Beaulieu | Cabernet Sauvignon | 314 |
| 1992 | Q3 | Beaulieu | Cabernet Sauvignon | 324 |
| 1992 | Q4 | Beaulieu | Cabernet Sauvignon | 388 |
| 1992 | Q1 | Beaulieu | Cabernet Sauvignon | 620 |
| 1992 | Q1 | Beaulieu | Cabernet Sauvignon | 400 |
| 1992 | Q2 | Beaulieu | Cabernet Sauvignon | 411 |
| 1992 | Q3 | Beaulieu | Cabernet Sauvignon | 419 |
| 1992 | Q4 | Beaulieu | Cabernet Sauvignon | 423 |
| 1992 | Q1 | Beaulieu | Cabernet Sauvignon | 200 |
| 1992 | Q2 | Beaulieu | Cabernet Sauvignon | 213 |
| 1992 | Q3 | Beaulieu | Cabernet Sauvignon | 223 |
| 1992 | Q3 | Beaulieu | Cabernet Sauvignon | 650 |
| 1992 | Q4 | Beaulieu | Cabernet Sauvignon | 233 |
| 1991 | Q2 | Beaulieu | Chardonnay | 425 |
| 1991 | Q3 | Beaulieu | Chardonnay | 460 |
| 1991 | Q4 | Beaulieu | Chardonnay | 450 |
| 1991 | Q1 | Beaulieu | Chardonnay | 230 |
| 1991 | Q2 | Beaulieu | Chardonnay | 235 |
| 1991 | Q3 | Beaulieu | Chardonnay | 240 |
| 1991 | Q4 | Beaulieu | Chardonnay | 255 |
| 1991 | Q1 | Beaulieu | Chardonnay | 180 |
| 1991 | Q2 | Beaulieu | Chardonnay | 200 |
| 1991 | Q3 | Beaulieu | Chardonnay | 225 |
| 1991 | Q4 | Beaulieu | Chardonnay | 230 |
| 1991 | Q1 | Beaulieu | Chardonnay | 270 |
| 1991 | Q2 | Beaulieu | Chardonnay | 270 |
| 1991 | Q3 | Beaulieu | Chardonnay | 275 |
| 1991 | Q4 | Beaulieu | Chardonnay | 290 |
| 1991 | Q1 | Beaulieu | Chardonnay | 450 |
| 1992 | Q1 | Beaulieu | Chardonnay | 400 |
| 1992 | Q2 | Beaulieu | Chardonnay | 411 |
| 1992 | Q3 | Beaulieu | Chardonnay | 415 |
| 1992 | Q4 | Beaulieu | Chardonnay | 419 |
| 1992 | Q1 | Beaulieu | Chardonnay | 200 |
| 1992 | Q2 | Beaulieu | Chardonnay | 201 |
| 1992 | Q3 | Beaulieu | Chardonnay | 208 |
| 1992 | Q4 | Beaulieu | Chardonnay | 220 |
| 1992 | Q1 | Beaulieu | Chardonnay | 170 |
| 1992 | Q2 | Beaulieu | Chardonnay | 175 |
| 1992 | Q3 | Beaulieu | Chardonnay | 180 |
| 1992 | Q4 | Beaulieu | Chardonnay | 175 |
| 1992 | Q1 | Beaulieu | Chardonnay | 230 |
| 1992 | Q2 | Beaulieu | Chardonnay | 232 |
| 1992 | Q3 | Beaulieu | Chardonnay | 219 |
| 1992 | Q4 | Beaulieu | Chardonnay | 225 |
| 1991 | Q1 | Beaulieu | Merlot | 180 |
| 1991 | Q2 | Duckhorn | Merlot | 660 |
| 1991 | Q3 | Duckhorn | Merlot | 665 |
| 1991 | Q4 | Duckhorn | Merlot | 670 |
| 1991 | Q1 | Duckhorn | Merlot | 325 |
| 1991 | Q2 | Duckhorn | Merlot | 329 |
| 1991 | Q3 | Duckhorn | Merlot | 330 |
| 1991 | Q4 | Duckhorn | Merlot | 341 |
| 1991 | Q1 | Duckhorn | Merlot | 660 |
| 1991 | Q3 | Beaulieu | Merlot | 350 |
| 1991 | Q2 | Beaulieu | Merlot | 325 |
| 1991 | Q1 | Beaulieu | Merlot | 320 |
| 1991 | Q4 | Beaulieu | Merlot | 650 |
| 1991 | Q3 | Beaulieu | Merlot | 625 |
| 1991 | Q2 | Beaulieu | Merlot | 575 |

TABLE 1-continued

Example Data For Reports

| Year | Quarter | Winery | Grape | Cases Sold |
|---|---|---|---|---|
| 1991 | Q1 | Beaulieu | Merlot | 550 |
| 1991 | Q4 | Beaulieu | Merlot | 280 |
| 1991 | Q3 | Beaulieu | Merlot | 230 |
| 1991 | Q2 | Beaulieu | Merlot | 275 |
| 1991 | Q1 | Beaulieu | Merlot | 270 |
| 1991 | Q4 | Beaulieu | Merlot | 200 |
| 1991 | Q3 | Beaulieu | Merlot | 195 |
| 1991 | Q2 | Beaulieu | Merlot | 190 |
| 1991 | Q2 | Duckhorn | Merlot | 481 |
| 1991 | Q3 | Duckhorn | Merlot | 485 |
| 1991 | Q4 | Duckhorn | Merlot | 499 |
| 1991 | Q1 | Duckhorn | Merlot | 275 |
| 1991 | Q2 | Duckhorn | Merlot | 280 |
| 1991 | Q3 | Duckhorn | Merlot | 285 |
| 1991 | Q4 | Duckhorn | Merlot | 289 |
| 1991 | Q1 | Duckhorn | Merlot | 200 |
| 1991 | Q2 | Duckhorn | Merlot | 206 |
| 1991 | Q3 | Duckhorn | Merlot | 212 |
| 1991 | Q4 | Duckhorn | Merlot | 220 |
| 1991 | Q1 | Duckhorn | Merlot | 289 |
| 1991 | Q2 | Duckhorn | Merlot | 287 |
| 1991 | Q3 | Duckhorn | Merlot | 291 |
| 1991 | Q4 | Duckhorn | Merlot | 301 |
| 1991 | Q1 | Duckhorn | Merlot | 480 |
| 1991 | Q4 | Beaulieu | Merlot | 370 |
| 1992 | Q2 | Duckhorn | Merlot | 691 |
| 1992 | Q1 | Beaulieu | Merlot | 620 |
| 1992 | Q4 | Beaulieu | Merlot | 244 |
| 1992 | Q3 | Beaulieu | Merlot | 234 |
| 1992 | Q2 | Beaulieu | Merlot | 232 |
| 1992 | Q1 | Beaulieu | Merlot | 230 |
| 1992 | Q4 | Beaulieu | Merlot | 181 |

TABLE 1-continued

Example Data For Reports

| Year | Quarter | Winery | Grape | Cases Sold |
|---|---|---|---|---|
| 1992 | Q3 | Beaulieu | Merlot | 178 |
| 1992 | Q2 | Beaulieu | Merlot | 171 |
| 1992 | Q1 | Beaulieu | Merlot | 170 |
| 1992 | Q2 | Beaulieu | Merlot | 621 |
| 1992 | Q3 | Beaulieu | Merlot | 655 |
| 1992 | Q4 | Beaulieu | Merlot | 645 |
| 1992 | Q1 | Beaulieu | Merlot | 310 |
| 1992 | Q2 | Beaulieu | Merlot | 321 |
| 1992 | Q3 | Beaulieu | Merlot | 315 |
| 1992 | Q4 | Beaulieu | Merlot | 330 |
| 1992 | Q1 | Duckhorn | Merlot | 690 |
| 1992 | Q4 | Duckhorn | Merlot | 280 |
| 1992 | Q3 | Duckhorn | Merlot | 275 |
| 1992 | Q2 | Duckhorn | Merlot | 273 |
| 1992 | Q1 | Duckhorn | Merlot | 270 |
| 1992 | Q4 | Duckhorn | Merlot | 198 |
| 1992 | Q3 | Duckhorn | Merlot | 195 |

TABLE 1-continued

Example Data For Reports

| Year | Quarter | Winery | Grape | Cases Sold |
|---|---|---|---|---|
| 1992 | Q2 | Duckhorn | Merlot | 191 |
| 1992 | Q1 | Duckhorn | Merlot | 190 |
| 1992 | Q4 | Duckhorn | Merlot | 301 |
| 1992 | Q3 | Duckhorn | Merlot | 295 |
| 1992 | Q2 | Duckhorn | Merlot | 291 |
| 1992 | Q1 | Duckhorn | Merlot | 290 |
| 1992 | Q4 | Duckhorn | Merlot | 510 |
| 1992 | Q3 | Duckhorn | Merlot | 508 |
| 1992 | Q2 | Duckhorn | Merlot | 502 |
| 1992 | Q1 | Duckhorn | Merlot | 500 |
| 1992 | Q4 | Duckhorn | Merlot | 360 |
| 1992 | Q3 | Duckhorn | Merlot | 344 |
| 1992 | Q2 | Duckhorn | Merlot | 345 |
| 1992 | Q1 | Duckhorn | Merlot | 340 |
| 1992 | Q4 | Duckhorn | Merlot | 699 |
| 1992 | Q3 | Duckhorn | Merlot | 695 |

The data included in Table 1 may be condensed into the following easy to read cross-tabulated report having the top labels of year and quarter, the side labels of winery and grape and the facts of cases sold. The facts represent the aggregated values in the center of the report displayed as the number of cases of each grape sold in each quarter for each winery.

Report 1

| | | | 1991 | | | | 1992 | | | |
|---|---|---|---|---|---|---|---|---|---|---|
| | | | Q1 | Q2 | Q3 | Q4 | Q1 | Q2 | Q3 | Q4 |
| Beaulieu | Cabernet Sauvignon | Cases Sold | 1350 | 1470 | 1515 | 1635 | 1530 | 1563 | 1616 | 1714 |
| | Chardonnay | Cases Sold | 1130 | 1130 | 1200 | 1225 | 1000 | 1019 | 1022 | 1039 |
| | Merlot | Cases Sold | 1320 | 1365 | 1400 | 1500 | 1330 | 1345 | 1382 | 1400 |
| Duckhorn | Merlot | Cases Sold | 2229 | 2243 | 2268 | 2320 | 2280 | 2293 | 2312 | 2348 |

This same data may also be condensed into the following different cross-tabulated report having the top label of quarter, the side labels of year, winery and grape and the facts of cases sold. The facts still represent the aggregated values in the center of the report displayed as the number of cases each grape sold in each quarter for each winery.

| | | | | Report 2 | | | |
|---|---|---|---|---|---|---|---|
| | | | | Q1 | Q2 | Q3 | Q4 |
| 1991 | Beaulieu | Cabernet Sauvignon | Cases Sold | 1350 | 1470 | 1515 | 1635 |
| | | Chardonnay | Cases Sold | 1130 | 1130 | 1200 | 1225 |
| | | Merlot | Cases Sold | 1320 | 1365 | 1400 | 1500 |
| | Duckhorn | Merlot | Cases Sold | 2229 | 2243 | 2266 | 2320 |
| 1992 | Beaulieu | Cabernet Sauvignon | Cases Sold | 1530 | 1563 | 1616 | 1714 |
| | | Chardonnay | Cases Sold | 1000 | 1019 | 1022 | 1039 |
| | | Merlot | Cases Sold | 1330 | 1345 | 1382 | 1400 |
| | Duckhorn | Merlot | Cases Sold | 2290 | 2293 | 2312 | 2348 |

The only difference between the Report 1 and the Report 2 is the manner in which the data or facts are displayed. The year label was pivoted or rotated from the top of the report, as illustrated in the Report 1, to the side of the report, as illustrated in the Report 2. With a good cross-tabulation tool a user should be able to go between the two reports quickly and easily.

Current cross-tabulation tools will become overloaded if a user attempts to push too much source data through the cross-tabulation engine. Such prior art cross-tabulation engines will become overloaded when users work on 10,000 to 20,000 rows of source data, because these engines rely on access to the rows of source data in order to pivot or rearrange the data for display in a cross-tabulation report. Users who desire to work with this amount of source data are prevented from using the prior art cross-tabulation tools.

The main reason why the cross-tabulation tools of the prior art are unable to manipulate large amounts of data is attributed to the storage structures and the methods employed. While the exact methods are not publicly available, it is believed that the cross-tabulation tools of the prior art are not self-contained, but require complete access to the source data. It is also believed that the cross-tabulation data structures used by the tools of the prior art use either a cached display template or a hashed data storage module. Neither of these data structures provides enough structural information in the cross-tabulation data structure to support arbitrary restructurings without access to the source data.

What is needed is a cross-tabulation tool which pivots and restructures a cross-tabulation report easily and efficiently without requiring access to the source data. What is also needed is a cross-tabulation tool which will accumulate an incoming stream of data records into a data structure which may then be used to form and restructure a cross-tabulation report without the necessity of storing the stream of data records into a computer's memory for later access by the cross-tabulation tool.

SUMMARY OF THE INVENTION

A method of and apparatus for preparing and modifying cross-tabulation analysis and reporting utilizes a data structure for storing aggregate data, gathered or input from a stream of data records. The data structure stores the aggregates of the data values, so that as cross-tab reports are generated, access to the original stream of data records is not necessary. Preferably, a tree-type data structure is utilized. The tree-type data structure is arranged relative to a root. The root of the tree is the first node in the tree. It has no parent node and no sibling nodes. Directly related to the root of the tree are labels of a first level. Labels of a second level and then labels of succeeding levels may follow, as required. Each level includes multiple nodes corresponding to the arrangement of the data. Each node has an array of accompanying cells in which the aggregates of the data values are stored. As the cross-tab report is modified, the tree-type data structure is also correspondingly modified by either changing the pointers between levels and nodes or by rearranging the levels. The aggregate values are then updated accordingly. A cross-tree is also maintained with the same structure as the main tree except that the cross-tree does not include the side label levels or nodes. When the labels of the cross-tab report are rearranged or removed, preferably the data structure is modified in place. Alternatively, a separate data structure may be constructed from the original data structure.

DETAILED DESCRIPTION OF THE PREFERRED EMBODIMENT

DEFINITIONS

Figure 1:
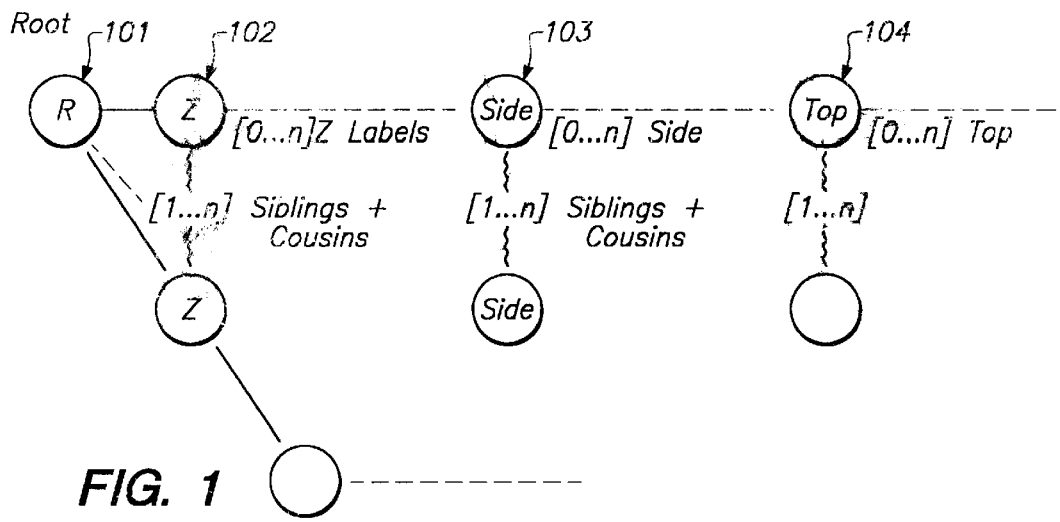
FIG. 1 illustrates the structure of the master tree corresponding to the cross-tab report to be generated.

The following definitions are helpful to the understanding of the present invention.

Label

Labels are the categories by which data is grouped in a cross-tab report. When the cross-tab report is displayed in a rectilinear format, the labels appear on the top and side of the report. In the example above, referred to as Report 1, the top labels are year and quarter and the side labels are winery and grape.

Fact

Facts are the data items which are aggregated in a cross-tab report. When the cross-tab report is displayed in a rectilinear format, the facts appear in a central matrix of the report. In the example above, referred to as Report 1, the facts represent the number of cases sold.

Rectilinear

A rectilinear format or display is one which resembles a standard spreadsheet. Labels appear on the top and sides of the report, and facts appear in the central matrix of the report.

Streaming

Streaming refers to the process of reading portions of the available data, processing it, and then flushing it from memory before reading the next portion of the available data. This technique allows the program to handle much larger amounts of data than will fit into memory at one time.

Record

A record is a collection of data where each element, or field, has a predefined type. Records are used in groups of one or more records all of which have the same structure. Table 1 above, is a group of 144 records which are used to generate the cross-tab Report 1 and Report 2.

Column

A column is a collection of all of the fields of the same type in a record set. The terms rows and columns follow from the fact that data is frequently represented as a 2-dimensional array where each record is a row in the array.

Record Set

A record set is a collection of records from the same data set. All records in the set must have the same structure. Table 1 above represents a record set.

Field

A field is a component of a record. Each field has a name and a type. In Table 1 there are five fields including year, quarter, winery, grape and cases sold.

Row

A row is another term for a record in a record set. The terms row and column follow from the fact that data is frequently represented as a 2-dimensional array where each record is a row in the array.

Relation

A relation is a collection of records which are represented as a 2-dimensional array. Each row in this array is a record. Thus, all of the data in each column is of the same type.

Null

A Null is a field in a record which is empty. Nulls do not have any value, and must be treated specially when taking average values or performing other such calculations.

Z Labels

A Z label is a label along the z-axis of the graph, if the top and side labels are the x and y axes, respectively. The z-axis will then allow the user to view a slice of the data shown in the x/y plane. Z labels allow a user to view a slice of the data by only showing the aggregate facts associated with a certain value. For example, "Year" could be used as a Z label, allowing the user to view the number of cases sold for 1991 and 1992 separately, rather than viewing the total number of cases sold for both years.

Level of Tree

The level of the tree is determined by counting the number of links from a node of interest to the root. In the pivot tree, described below, a node's level is equal to the number of parents minus one because the root is not counted. Note that all nodes on a given level correspond to the same label; conversely each label has all of its nodes on the same level.

Cousin Nodes

A cousin node is a node which is on the same level of the tree, but which may or may not share a common parent node. All nodes corresponding to the same label are cousins.

Top labels

Top labels are those labels which are usually displayed along the top of the cross-tab report. However, "top labels" can actually be displayed in an alternate location, for instance along the bottom of the report. The term top label therefore refers to a group of labels, rather than labels which are always physically displayed in the same location. A cross-tab report may have 0 or more top labels. If the report has more than 1 top label, the outermost top label may be referred to as a super label, while the inner labels are sub labels.

Side labels

Side labels are those labels which are usually displayed along the side of the cross-tab report. However, "Side labels" can actually be displayed in an alternate location, for instance along the bottom of the report. The term side label therefore refers to a group of labels, rather than labels which are always physically displayed in the same location. A cross-tab report may have 0 or more side labels. If the report has more than 1 side label, the outermost side label may be referred to as a super label, while the inner labels are sub labels.

Tree

A tree is a data structure used in computer programs. It is composed of a root node which has no parent node and no sibling nodes. The root may have child nodes. In addition, the tree may contain one or more additional nodes, including any children of the root. Each additional node in the tree has exactly one parent node. All nodes in the tree may have one or more child nodes. All of the nodes in a tree are connected to the root node via one or more levels of hierarchy. Although it is customary to refer to the Root of the tree as the top level of the tree and other levels as being subordinate to the root, trees may be drawn in a variety of ways. The trees in the figures are drawn with the root node on the left and the subsequent levels of hierarchy from left to right.

Root

The root of the tree is the first node in the tree. It has no parent node and no sibling nodes.

Node

A node is a component of a tree which has a parent node and one or more child nodes. In some computer systems, nodes also keep track of their sibling nodes.

Leaf (Node)

A leaf is a node in a tree which has no child nodes.

Interior Node

Interior nodes may also be referred to as non-leaf nodes. An interior node is a node which has one or more child nodes.

Parent (Node)

A parent node is a node which has one or more nodes connected subordinate to it in a tree. A Parent of a particular node is that node which is connected directly superior to the node in question. Except for the root node, all nodes in a tree have exactly one parent.

Child (Node)

A child node is a node which has a node connected superior to it in a tree. Except for the root, all nodes in a tree are child nodes. A Child of a particular node is a node which is connected directly subordinate to the node in question. Nodes may have zero or more children.

Sibling (Node)

Sibling nodes are all nodes which share a common parent. A sibling node is a node which shares a common parent with the node in question. Nodes may have zero or more siblings. In the system described below, all sibling nodes are also cousins.

Cell

A cell is a data structure used by the system described below to store aggregate values of fact data. Each cell contains an aggregate value, the count of rows contributing to that value, and the number of rows with null values included in the row count.

Left/Right Most Child

For convenience, the child nodes of a node may be ordered. The first child in order is considered to be the Left Most Child. The last child in order is considered to be the Right Most Child.

Variable

A variable is a value within a computer program which may be modified by the program to contain different values as the program executes. The value of variables is often, but not always, determined by the inputs to the program.

Master Tree Structure

The new pivot algorithm utilized in the present invention is based upon the use of a tree structure which stores aggregate data gathered from a record source. The structure of the tree is shown in FIG. 1. The first node is the root of the tree 101. Each level of the tree contains nodes which represent a single label or column in a cross-tab report. The levels are arranged such that directly after the Root are any "Z Labels" 102, after any Z-labels 102 are any Side Labels 103 and after the Side Labels 103 are any Top Labels 104. Within each section the labels are arranged so that the outermost labels come first. The other labels for the section follow in order until the innermost label is represented by a level of nodes.

Figure 2:
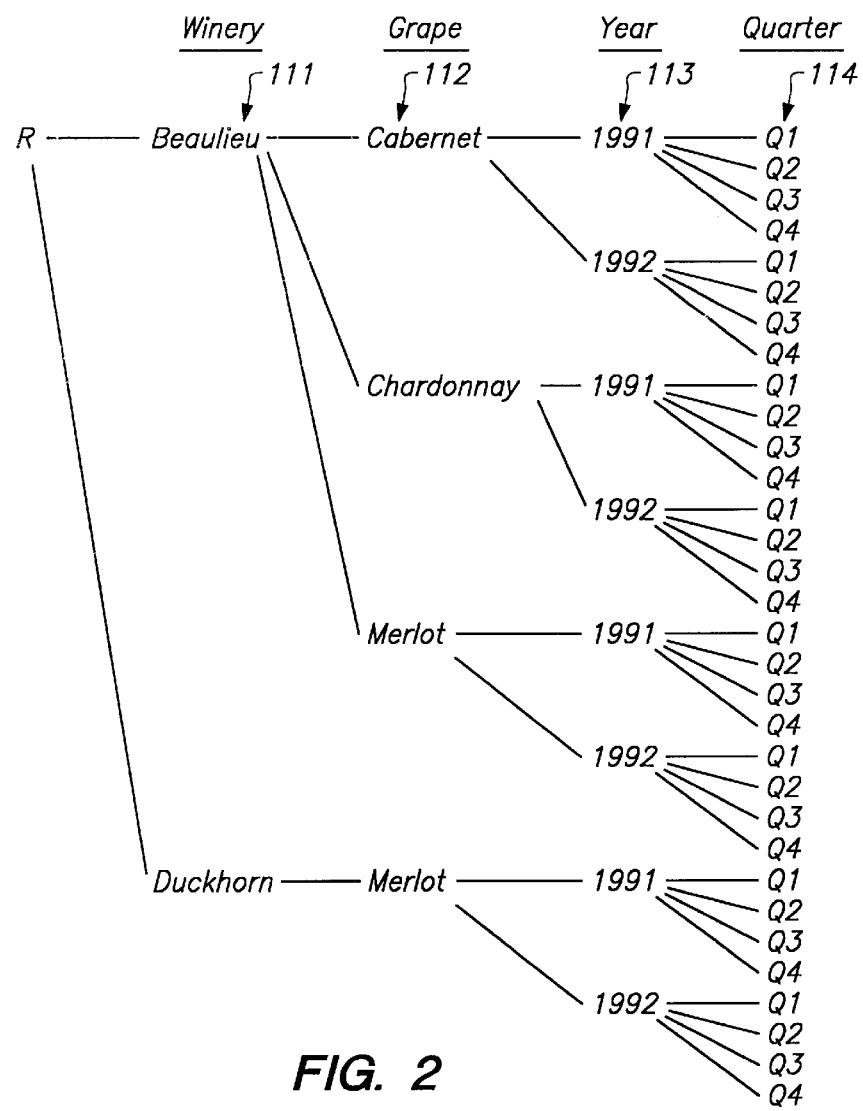
FIG. 2 illustrates an example master tree formed from the sample data included in Table 1.

An example tree based upon the sample data used above is shown in FIG. 2. For the sake of simplicity, no Z labels are shown in the example. The winery side label 111 and the grape side label 112 follow the root 110. The top labels of year 113 and quarter 114 then follow the side labels.

Figure 3:
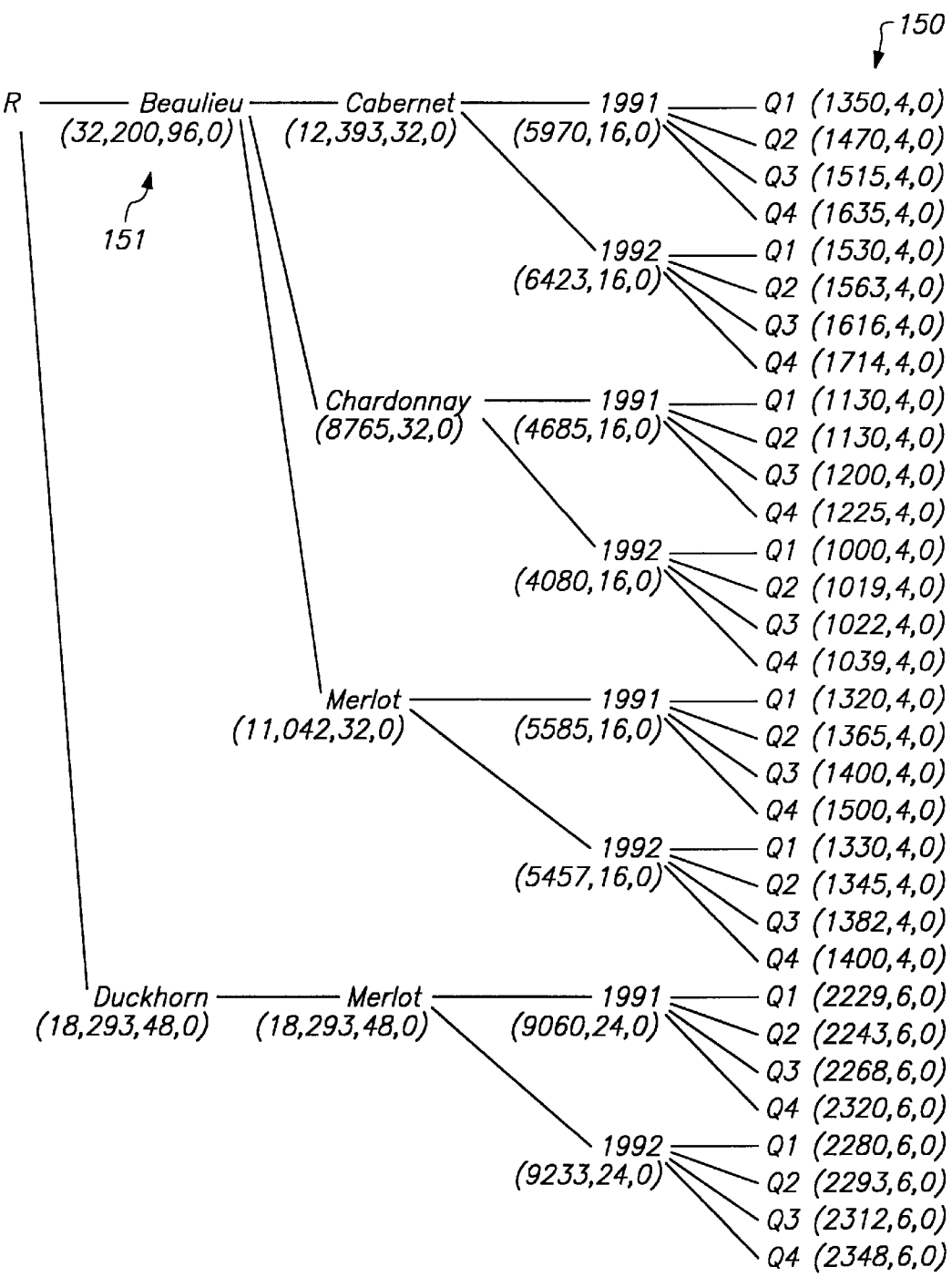
FIG. 3 illustrates the example tree of FIG. 2 with fact cells added for the fact number of cases sold.

Within each level are nodes which each contain an array of cells for storing an aggregate value for each fact supported by the tree. These cells contain the aggregate of all the values for the given fact, the number of rows used to produce this aggregate, and the number of rows which contain a Null value for the fact which are included in the aggregate. FIG. 3 shows the example tree of FIG. 2 with fact cells added for a single fact, "Cases Sold," as illustrated in the examples above. The cells are shown in parentheses near each respective node. The two cells 150 and 151 are illustrated. The cell 150 includes the value 1350, the number of rows 4 and the number of Nulls 0. The cell 151 includes the value 32,200, the number of rows 96 and the number of Nulls 0. The basic cross tab report represented by this tree is shown above in the Report 1.

Figure 4:
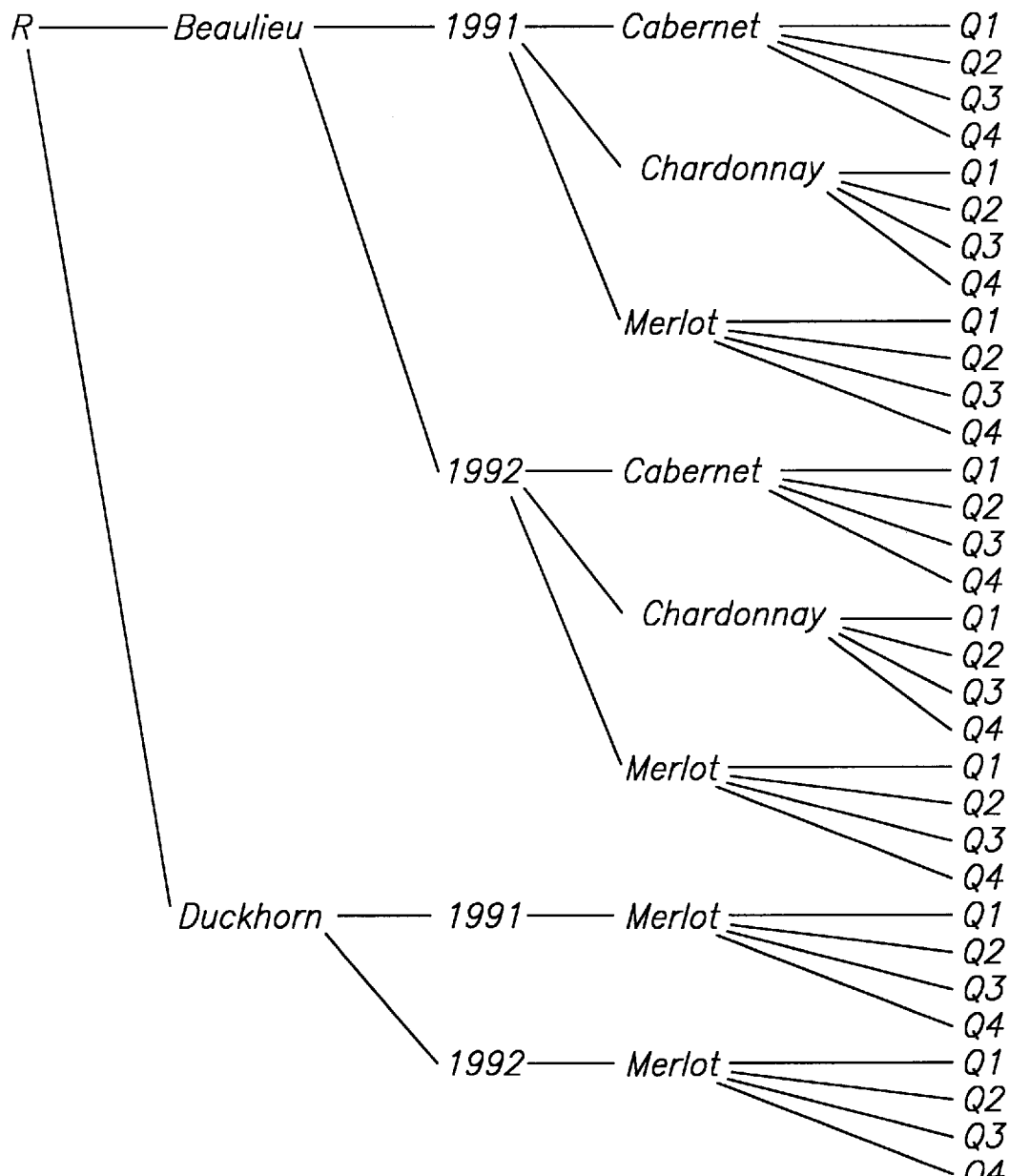
FIG. 4 illustrates a modified tree structure corresponding to the cross-tab report included in Report 2.

The cells within the tree contain the aggregate data which is used to build the cross-tab report. Should the user desire to pivot or rearrange the labels of the report, the structure of the report is changed and a new report generated simply by forming a new tree in which the levels of the tree have been rearranged to reflect the new report structure. Specifically, the level of the tree which corresponds to the label being moved is relocated within the tree so that it corresponds to its new location. A tree structure representing the cross-tab report shown above in the Report 2 is illustrated in FIG. 4. Specifically, the year label has been moved from a top label to a side label within both the tree structure and the cross-tab report. It should be noted that the tree always has the same number of leaf nodes regardless of how the labels are arranged. Furthermore, the same label set will always produce the same fact data at the leaf nodes, although the nodes may occur in a different order. The leaf nodes represent the last level within the tree structure.

Most real data sets contain many rows which are aggregated for each entry in a cross-tab report. The method and apparatus of the present invention accumulates the aggregate values as the data is input, building the tree structure from the data. When a cross-tab report is desired by the user, the present invention will generate the desired cross-tab report from the tree-structure or modify the tree structure to generate the appropriate cross-tab report. Thus, the original stream of data does not have to be re-accessed in order to generate a cross-tab report. Manipulating the tree is considerably faster than scanning all of the source data. The cross-tab report is then generated from the aggregate values of the modified tree.

Figure 5:
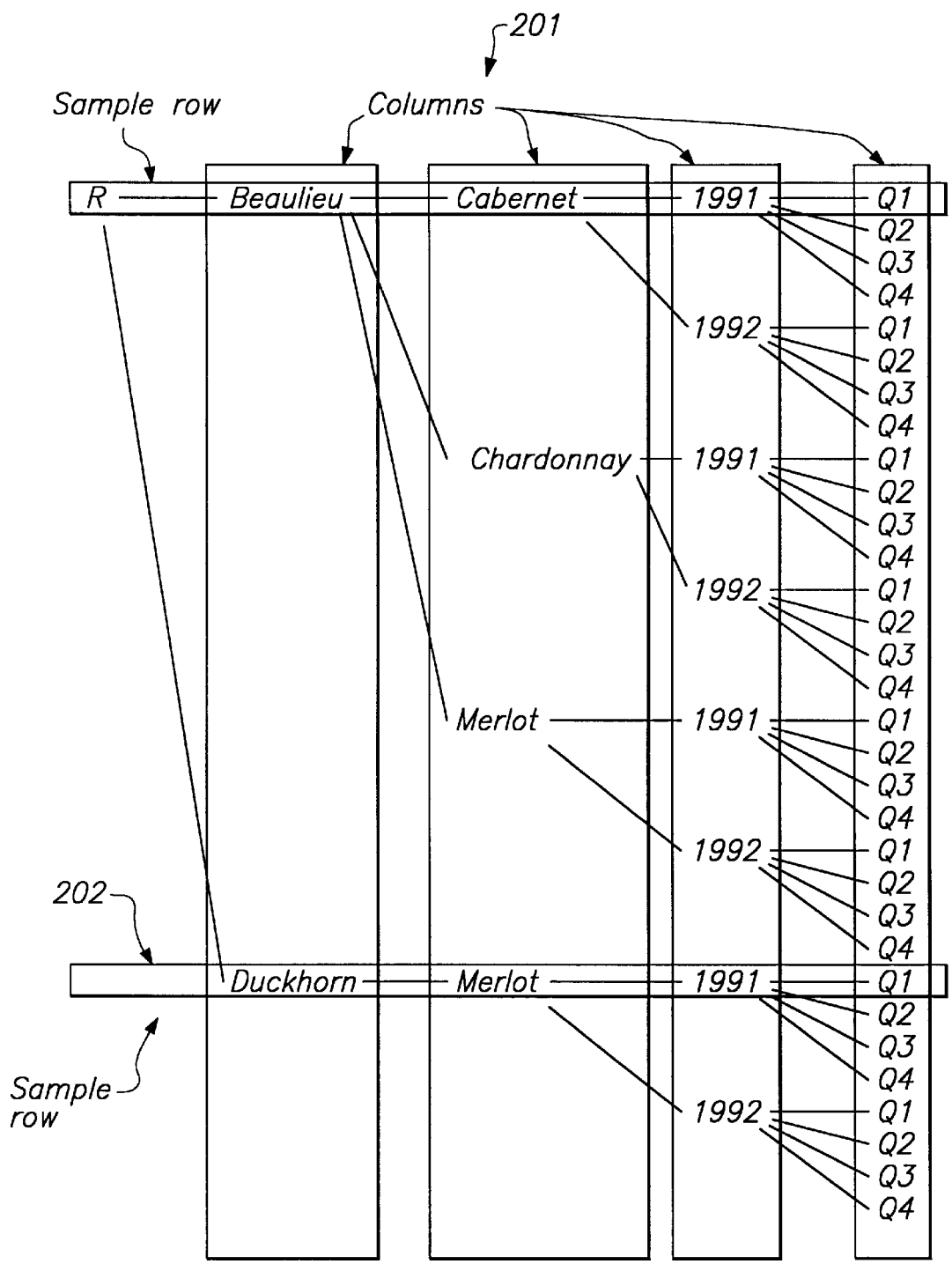
FIG. 5 illustrates an example of the master tree structure with row and column boxes showing the relation of the data within the tree structure.

The tree structure of the present invention may be considered to represent the aggregate data in a relation form. When the tree is draw from left to right so that the root is on the left and the levels of the tree progress to the right, a series of boxes may be drawn around each level of the tree to represent the columns of the source data and another series of boxes may be drawn around each path from the root of the tree to each leaf node to represent the aggregate of the related rows within the report. Such a tree structure is illustrated in FIG. 5 including the columns 201 and the selected rows 202.

Cross Tree Structure

Figure 6:
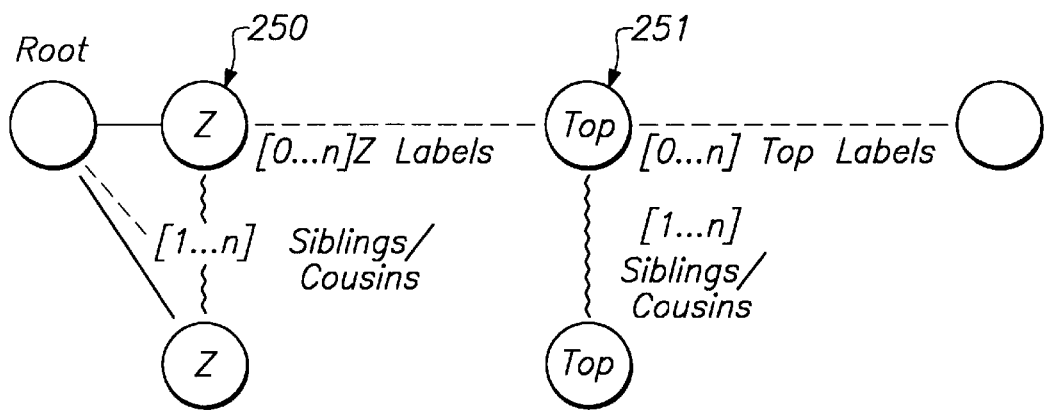
FIG. 6 illustrates the structure of the cross tree of the present invention.
Figure 7:
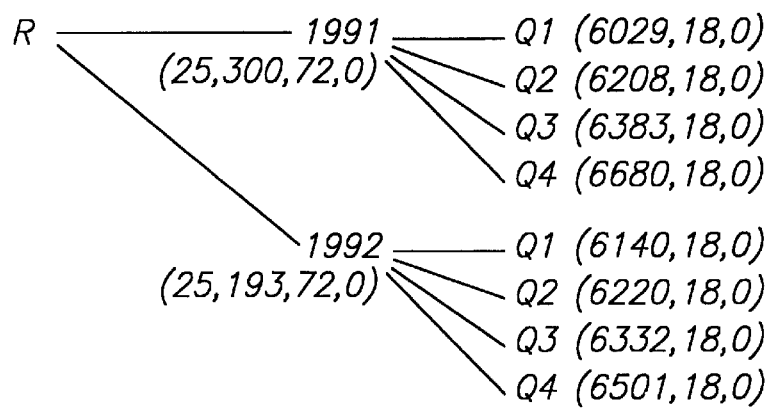
FIG. 7 illustrates the cross tree corresponding to the master tree illustrated in FIG. 2.

In addition to the master tree, a "cross tree" is also maintained by the present invention. The cross tree has the same structure as the master tree, except that it does not contain the levels for the side labels. FIG. 6 shows the structure of the cross tree. The cross tree has the same Z labels 250 as the master tree. It also has the same top labels 251 as the master tree. FIG. 7 shows the cross tree that is produced for the example tree illustrated in FIG. 2. It should be noted again that no Z-labels were used in this example. This cross tree is used to determine which of the top labels have corresponding fact data. Only those labels which have underlying data are shown in the report. The cross tree also contains the aggregate data for the top labels. This data may be used to produce columnar totals if desired.

Tree Maintenance and Manipulation

Many of the steps of building and updating the master tree depend upon the ability to add, remove and rearrange levels within the tree. The preferred method for altering the levels of the tree is to do so in place so that a single tree is modified. The current best mode of implementation in the program code of Appendix B forms a second tree with the desired structure from the original tree.

Tree Formation

Figure 8:
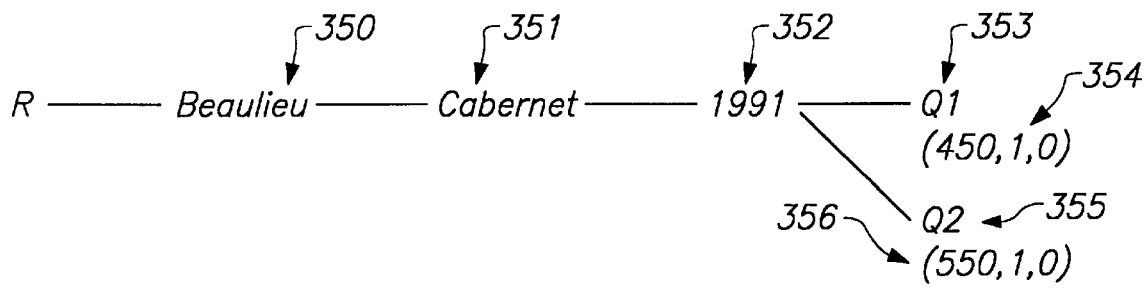
FIG. 8 illustrates an example of tree formation from a stream of data.

To form the tree shown in FIG. 2 the data stream included in Table 1 above is read by a computer system. The tree is formed incrementally as the stream of data is read. The label structure of the tree is known beforehand. In the example tree, the labels are ordered Winery, Grape, Year, Quarter. As each row of data is read, the tree is scanned in this order and new Label nodes are formed as necessary. An example of tree formation from the sample data is shown in FIG. 8. The first row of data includes the values 1991, Q1, Beaulieu, Cabernet and 450 for their respective columns, as illustrated in Table 1 above. For this row, a Beaulieu node 351 is formed in the first level. The node 351 is given a child node Cabernet 351, which gets a child node 1991 352. The last child node Q1 353 is added in the fourth level. The cell for this leaf node 354 is updated to include the aggregate information (450, 1, 0) indicating that the fact "Cases Sold" has a total value of 450 which was generated from 1 row of data with no Null data.

The next row of data includes the values 1991, Q2, Beaulieu, Cabernet, 550 for their respective columns. For this row, the Beaulieu 350, Cabernet 351, and 1991 352 nodes already exist so they are simply traversed. The Q2 node 355 is then added. The cell 356 for Q2 is updated to include the aggregate information (550, 1, 0) indicating that the fact "Cases Sold" has a total value of 550 which was generated from 1 row with no Null data. This process is repeated until all the rows have been processed, adding nodes to the tree-structure and total aggregate values as necessary. Once all the data has been read and the tree is complete, the fact values for interior nodes are calculated by starting at the leaves and aggregating the data for all siblings, setting this as the aggregate value for the parent. This is repeated throughout the tree until all of the nodes have corresponding aggregate fact values.

Labels must be considered in two different ways as the tree is being built. First, the labels must be considered as levels of labels. In FIG. 2 Winery, Grape, Year, and Quarter are all levels of labels. Within each level, the labels have specific values. For example, the labels within the Winery level have the values "Duckhorn" and "Beaulieu." The levels of the labels define the order in which the value of each label is read from each row of data.

Figure 9:
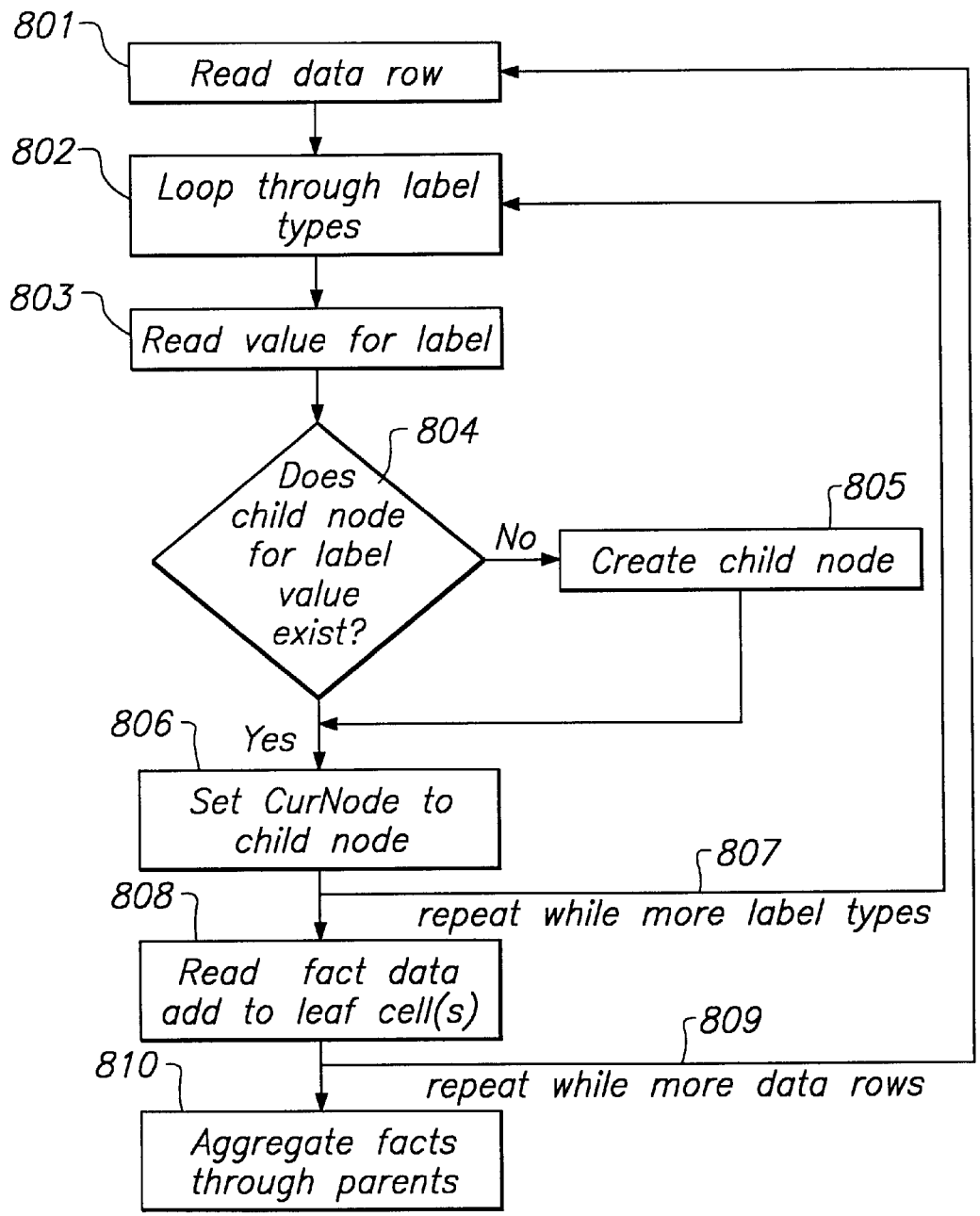
FIG. 9 illustrates a flow chart of the steps necessary to form the tree.

FIG. 9 shows a flow chart of the steps necessary to form the tree. At the beginning of the routine the current node is set to be the root of the tree being processed. The Block 801 is a loop block which reads the data for each row within the stream of data. The end of this loop is represented by the arrow 809. The loop beginning from the Block 801 is repeated until all of the rows of data have been read.

The Block 802 is an embedded loop block which cycles through each of the labels in the order they are to be stored in the tree. The end of this embedded loop is represented by the arrow 807. This loop is embedded inside loop 801. The loop beginning from the Block 802 is repeated until all of the levels of labels within the current row of data have been cycled through. The system then jumps to the Block 803 and reads the value of the label of the current level determined at the Block 802. The system then jumps to the Block 804 which is a decision block that checks to see if a child node already exists which has the same label value as the label value read from the current row of data. If the child node does not already exist the system forms the appropriate node at the Block 805. The Block 805 forms a node for the label value and makes it the child of the current node. After the child node is formed at the Block 805, or if the appropriate child node already existed, the current node is set to be the child node at the Block 806. If there are more labels within the current row, the system jumps back to the Block 802 and repeats the embedded loop for the next level of labels.

Once all of the label values for the current row have been cycled through, the fact data from the current row is read and added to the current leaf node at the Block 808. If there are more rows of data to be read the system jumps back to the Block 801 and repeats the loop for the next row of data. Once all of the rows of data have been read the facts from the leaf nodes through all of the parent nodes to the root node are aggregated at the Block 810.

Adding a Label

The usual process for adding a label to a tree is almost identical to forming the tree initially. The process can be made slightly more efficient by starting with the original tree. All nodes for labels after the added label must be removed from the original tree. Since the nodes before the new label do not change, they can be left in place and need not be formed again. This partial tree is then used as the starting tree for the algorithm described above in Tree Formation.

It is also possible to defer reading the data if many levels of labels are to be added at once. The levels of labels can all be added and then the data can be scanned only once to find the values for the new labels. Each of the new levels of labels are added to the list of levels of labels to be processed in Block 802. No nodes are formed within the tree until the data is processed.

Removing a Label

Figure 10:
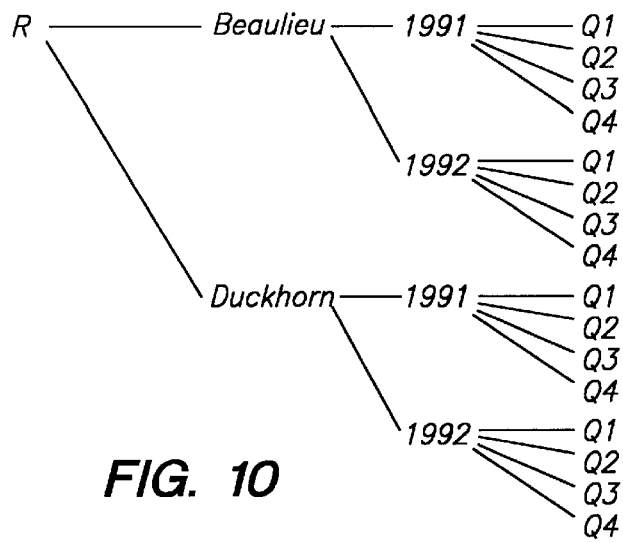
FIG. 10 illustrates the example tree of FIG. 2 with the grape label removed.

Removing a label from the tree does not require re-scanning the stream of data. Ideally, removing a label from the tree can be done in place. The implementation of the present invention described in Appendix B uses another method which will be described below. However, the concept behind in-place removal is briefly described here. FIG. 10 shows the example tree with the Grape level of label removed. The original tree shown in FIG. 2, is altered in order to remove a level while preserving the remaining structure of the tree.

Figure 11:
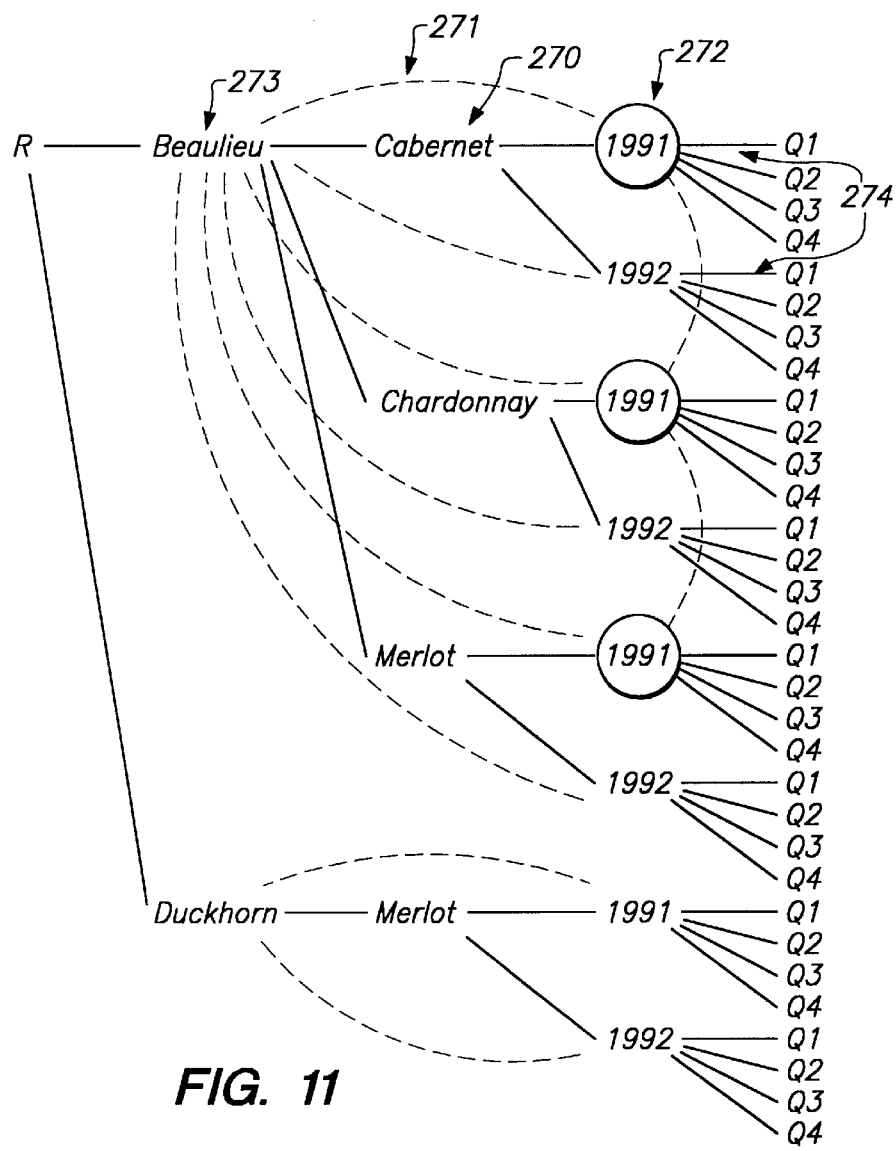
FIG. 11 illustrates an example of moving labels within a tree structure.

The process of altering the original tree will be described using the tree structure shown in FIG. 11. The basic concept is that the parent node 273 of each node which is to be removed 270 must adopt all of that nodes children 274 to be its own. Furthermore, as each child is adopted, children with the same label 272 are merged into a single node. As two nodes are merged, any children they have with duplicate labels must also be merged. The merging process is repeated throughout the children until all duplicates have been merged.

Moving a Label

Figure 14:
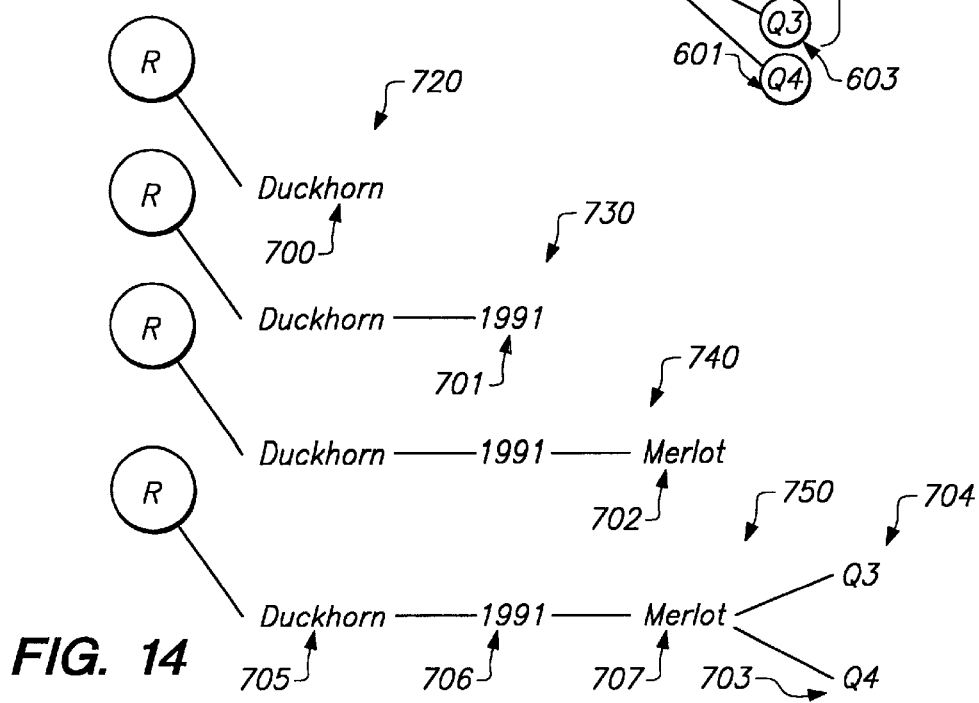
FIG. 14 illustrates the generation of the example tree with the Year label moved to just after the Winery label.

Moving a label within a tree also does not require re-scanning the data. This is due to the fact that the number of leaf nodes is constant regardless of how the labels in the tree are arranged. Rearranging the levels of the labels simply requires reordering the tree so that the new label order is represented in the tree. The preferred method for reordering the tree is to modify the tree in place. FIG. 14 shows the generation of the example tree with the Year label moved to just after the Winery label. The Enhancements section below describes one method for using an auxiliary matrix to facilitate in place modification of the tree.

In-place modification of the tree is difficult to implement. The implementation shown in Appendix B forms a new entire tree from the previous tree with the labels in the new order required. The routine responsible for forming the new tree is PvNode_Spawn, beginning on page 23 of Appendix B. It should be noted that this routine contains hooks for features which are not fully implemented or are not used by the basic algorithm described here. Specifically, tourAscend must always be 0, and, for the sake of simplicity, the nodeType is assumed to include all nodes. (Limiting the node type simply excludes some of the nodes from the copy.) The implementation included in Appendix B also uses this routine to remove a level of labels from the tree. The new tree is simply spawned from the old tree without including the removed label in the specification for the new tree.

Figure 12:
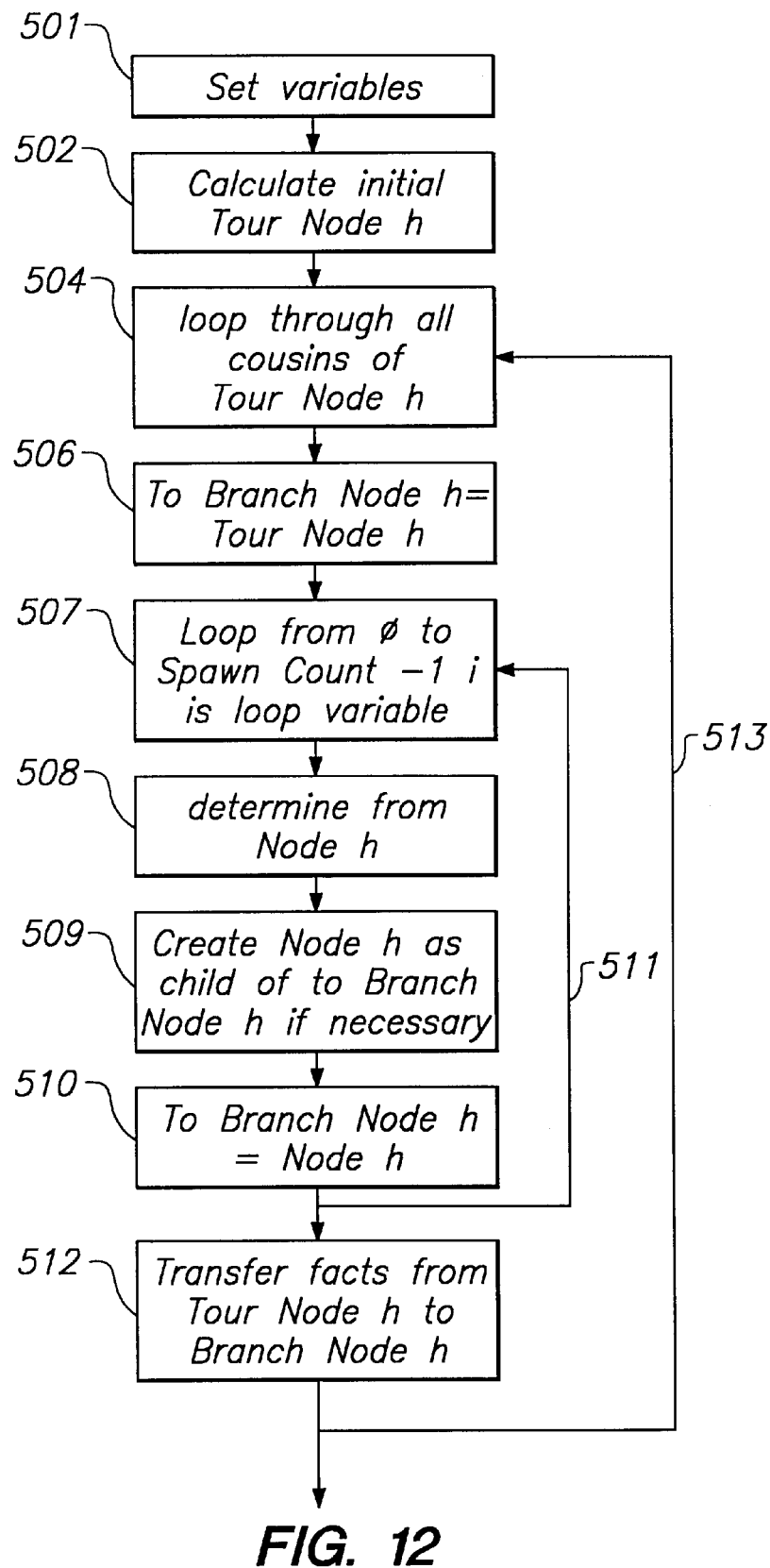
FIG. 12 illustrates a flow chart which describes the generation of a new tree using the spawn routine of the present invention.

FIG. 12 shows a flow chart which describes the generation of the new tree from the spawn routine. The inputs to the flow chart are the root for the original tree, fromRooth, the root for the new tree, toRooth, and an array of the levels of the original tree in the order desired for the new tree, spawnDepthArrh.

The variables spawncount and tourDepth are initialized at the Block 501. Specifically, the variable spawncount is set equal to the number of elements in the array spawnDepthArrh and the variable tourDepth is set equal to the largest value in the array spawnDepthArrh.

The original value of the node variable tourNodeh is calculated at the Block 502. Starting at the root fromRooth the algorithm moves to the left most child through a number of levels equal to the value of the variable tourDepth.

The Block 504 is an outer loop block. The Block 504 loops through each of the cousins of tourNodeh, setting the value of the variable tourNodeh to each cousin in turn. The end of the loop is represented by arrow 513. The loop beginning with the Block 504 is repeated until all the cousins of the node represented by tourNodeh are cycled through. The variable toBranchNodeh is then set equal to the root toRooth at the Block 506.

The Block 507 is an embedded loop block. The Block 507 loops from 0 to a value equal to the value spawncount −1, setting the loop variable, i, to each value in turn. The end of the loop is represented by the arrow 511. Note that this loop is embedded inside the loop beginning with the Block 504. The embedded loop beginning with the Block 507 is repeated for each value between 0 and spawncount −1.

The variable fromNodeh is set to equal the nth ancestor of the node represented by tourNodeh at the Block 508, where n is equal to the value of the variable tourDepth minus the current value in the array spawnArrh[i].

A new child for the node represented by the variable toBranchNodeh is formed at the Block 509, if necessary. The new child is a copy of the node represented by the variable fromNodeh. Before it is formed, the system first checks to see if a child with the same properties as the node represented by the variable fromNodeh already exists. If such a child does already exist, the existing child is reused. Otherwise, the child is formed at the Block 509. This child is stored in the variable nodeh.

The value of the variable toBranchNodeh is set equal to the value of the variable nodeh at the Block 510. If the value equal to spawncount −1 has not been reached the system jumps to the Block 507 and repeats the embedded loop for the next value i. Once the value equal to spawncount −1 is reached the fact information from the node represented by tourNodeh is aggregated into the cells of the new node represented by toBranchNodeh at the Block 512. If all of the cousins of the node represented by tourNodeh have not been cycled through the system jumps back to the Block 504 and repeats the loop for the next cousin. Once all the cousins have been processed the tree is complete.

Figure 13:
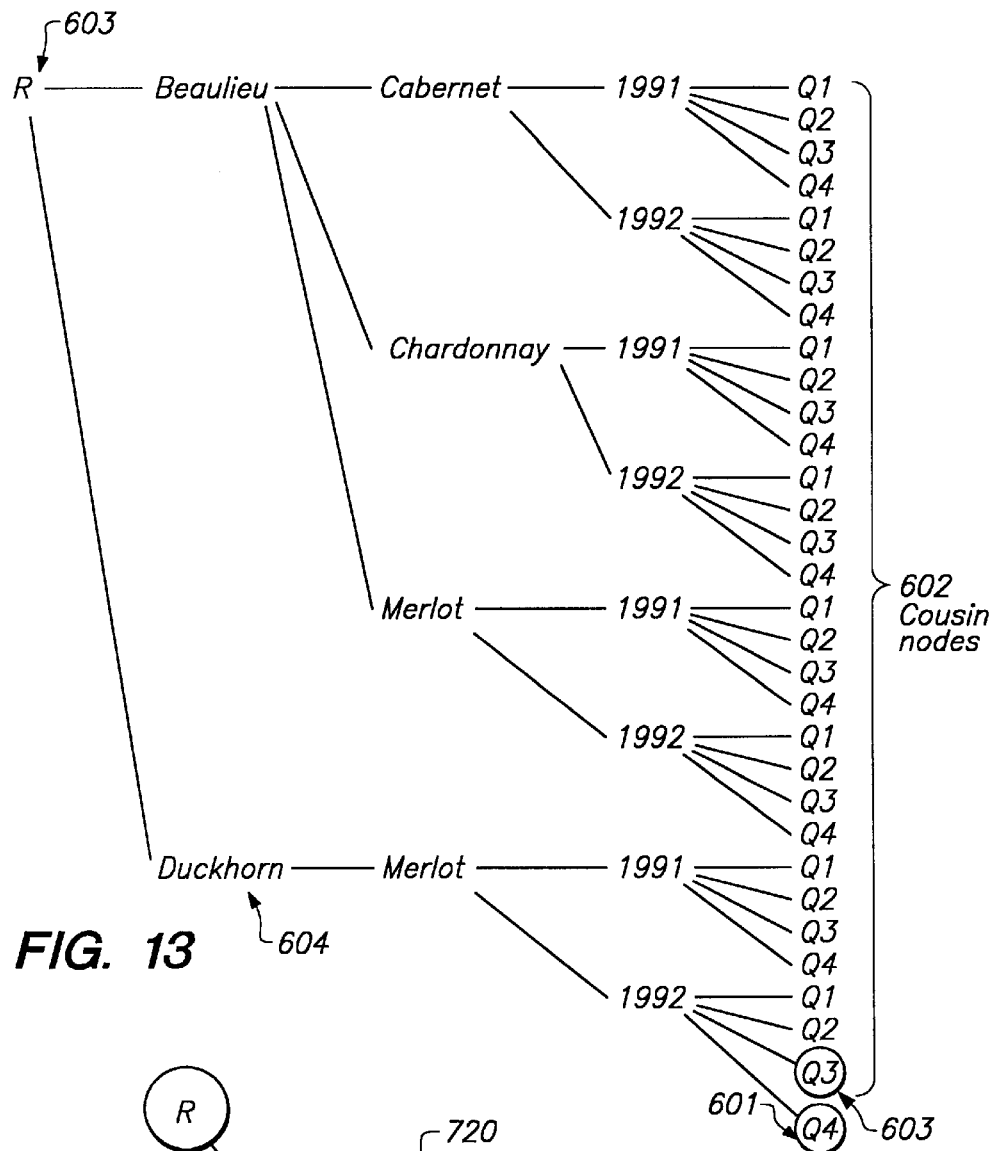
FIG. 13 illustrates which nodes are accessed at various stages of the process of generating a new tree.

The flow chart illustrated in FIG. 12 and described above is better understood by the following example. This example describes how this algorithm forms the tree illustrated in FIG. 4 from the tree illustrated in FIG. 2. The inputs to the flow chart are the root to the tree shown in FIG. 2, a new empty root and the array [0,2,1,3]. The array [0,2,1,3] indicates that the second level is to become the new first level, the first level is to become the new second level, and the other levels are to remain in place. FIG. 13 shows which nodes are accessed at various stages of the process.

The variables spawncount and tourDepth are initialized to 4 and 3, respectively at the Block 501. The original value of the variable tourNodeh 601 is calculated at the Block 502. All of the cousins of the variable tourNodeh are looped through at the Block 504 and subsequent blocks. The cousin nodes 602 will be processed by this loop.

In the first iteration of the loop beginning at the Block 504, the value of the variable toBranchNodeh is set equal to the value of the variable toRooth 603 at the Block 506. The loop beginning with the Block 507 loops through the values from 0 to spawnCount −1, setting the loop variable, i, to each value in turn. The value spawnCount −1 for this example is equal to 3. So the loop iterates from 0 to 3.

The variable fromNodeh 604 is set to be the nth ancestor of the node represented by tourNodeh at the Block 508, where the value n is equal to the value tourDepth minus the value spawnArrh[i]. In the first loop, i is equal to 0, spawnarrh[i] is equal to 0 and n is equal to 3.

A new child for the node represented by the variable toBranchNodeh is formed at the Block 509. This child, nodeh 700, is a copy of the node represented by variable fromNodeh. The variable toBranchNodeh is set equal to the child nodeh 700 at the Block 510. This completes the first iteration of the loop beginning with the Block 507. The new tree now looks like the tree 720 illustrated in FIG. 14. In the next iteration of this loop, the new node for 1991 701 is added. The tree now looks like the tree 730. In the third iteration of the loop, the new node for Merlot 702 is added. The tree now looks like the tree 740. In the last iteration, Q4 is added 703. The tree then looks like the tree 750. The fact information from the old Q4 node 601 to the new Q4 node 703 is then aggregated at the Block 512.

The system then returns to the outer loop block 504 which proceeds to the next cousin 603. The same process is repeated in the inner loop. Existing children are reused. Thus, the nodes for Duckhorn 705, 1991 706, and Merlot 707 are reused in this loop. Only the node Q3 704 is formed. Facts are then added to the new leaf node.

This process is repeated for all cousins until the entire tree has been processed, at which point the new tree will have the desired structure.

Generation of Cross-Tab Report

Figure 15:
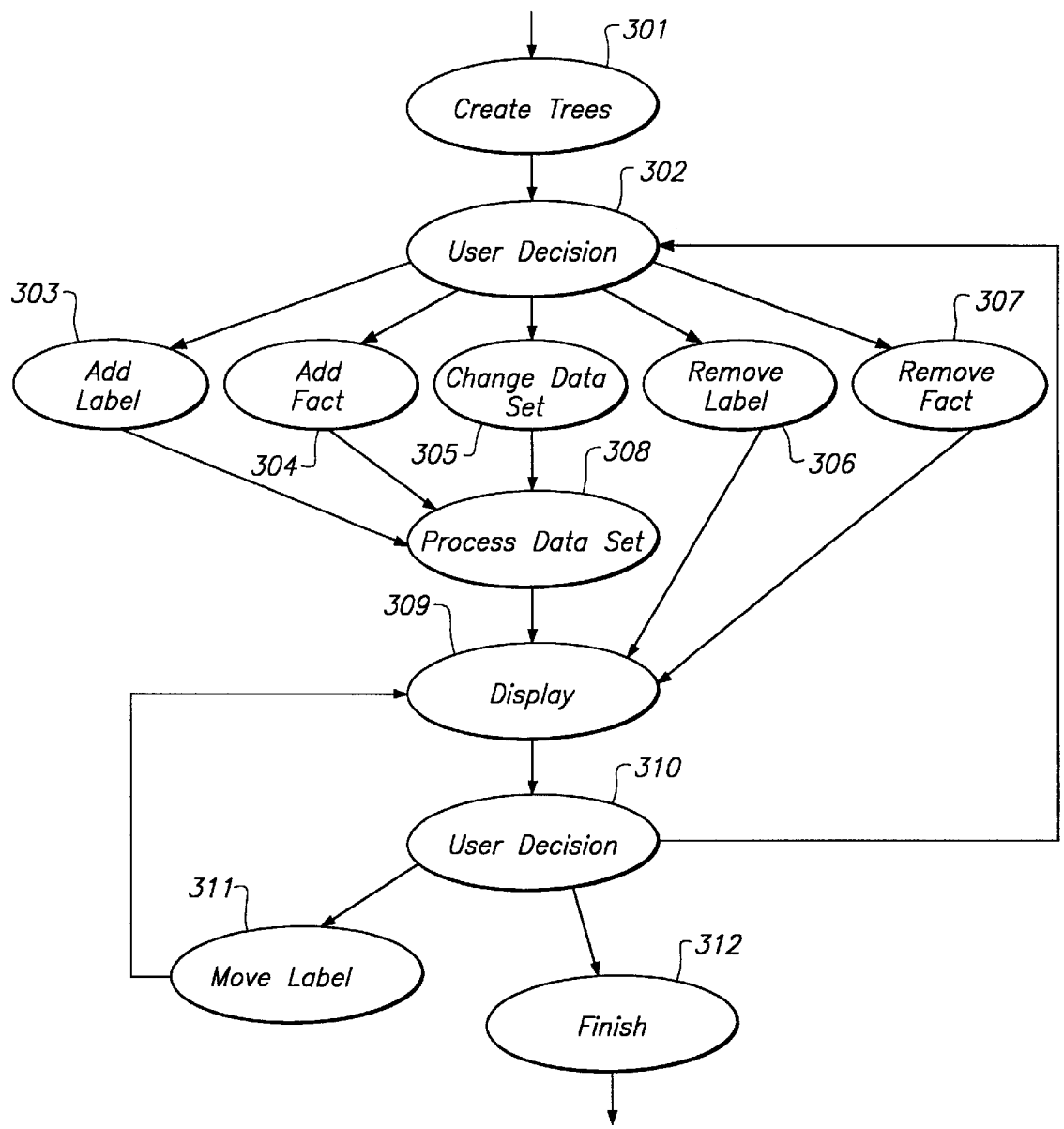
FIG. 15 illustrates the flow chart of the steps for forming a cross-tab report from the tree structure.

The flow chart of FIG. 15 illustrates the flow of the method used to form a cross-tab report from the tree structure. The cross tab data structures are formed at the Block 301. At the Block 301 an empty master tree is formed with a single root node. In addition, an empty cross tree is formed. The root node of each tree is formed as part of the empty tree. The routine PvTbl_Create beginning on page 51 of Appendix B demonstrates this process.

At the Block 302 the user decides between adding a top or side label, adding a fact, removing a label (if one is available to remove), removing a fact (if one is available to remove), or changing the data set. If the user desires to add a label, the system jumps to the Block 303. A label is added to the cross-tab report by adding a new level of nodes at the correct location in the master tree and updating the cross tree as necessary. Note that Z Labels, Side Labels and Top Labels are all added to the cross-tab report in the same manner, but at different locations within the corresponding tree structure. The routine PvTbl_LabelAdd beginning on page 54 of Appendix B demonstrates this process.

If the user desires to add a fact, the system jumps to the Block 304. A fact is added to the cross tab by forming an additional cell at each node in the tree which can hold the data for the added fact. The required data is the aggregate value of all of the rows which make up this node, the number of rows whose value is included in the aggregate, and the number of rows which make up this node and have a null value. The routine PvTbl_FactAdd beginning on page 65 of Appendix B demonstrates this process.

If the user desires to modify the data set used to calculate the values used in the labels and facts the system jumps to the Block 305. The data set can either be completely replaced or data can be incrementally added or deleted. To replace the entire data set, only the new data must be scanned. To incrementally change the data set only the data to be added or deleted must be scanned. Values from the added or deleted rows are simply added to, or deleted from, the aggregate values and labels.

If the user desires to remove a label from the cross-tab report the system jumps to the Block 306. A label is removed from the cross tab by removing the appropriate level of nodes from the master tree and updating the cross tree as necessary. A label is removed from the tree without re-scanning the data set. The routine PvTbl_LabelRemove beginning on page 56 of Appendix B demonstrates this process.

If the user desires to remove a fact from the cross-tab report the system jumps to the Block 307. A fact is removed from the cross-tab report by removing the cells which track this fact from the nodes of the corresponding tree structure. A fact is removed from the tree without re-scanning the data set. The routine PvTbl_FactRemove beginning on page 66 of Appendix B demonstrates this process.

From the Blocks 303, 304 and 305 the system jumps to the Block 308. The data stream is read and the new cross-tab report is produced at the Block 308, based upon the label structure, the fact structure and the data. Note that this step is optional and may be suppressed until all of the labels and facts have been added. Deferring calculation based upon the available data, speeds up label and fact addition because the data can be read once for numerous labels and/or facts. The data may be read by streaming. This allows the cross tab report to accumulate more information than can be stored in the computer system's memory at one time, because the tree aggregates the data as it is read and does not need to store all of the data in memory, simultaneously.

In the system demonstrated in Appendix B, calculation based on the available data may be deferred by not attaching a data stream until after all labels have been added to the tree structure. If data is available, adding a label or fact will cause the system demonstrated in Appendix B to automatically rescan the data.

From the Blocks 306, 307 and 308 the system jumps to the Block 309. The new cross tab report is displayed at the Block 309. Displaying the cross tab is a separate process from aggregating the data in the master and cross trees. Cross tab display can be accomplished in a number of ways as desired by the user. The cross-tab report may be displayed in a rectilinear format as shown in the Reports 1 and 2 above. Appendix B contains code to optimize a rectilinear interface by caching values based on an x,y coordinate system. This interface is not integral to the cross tab engine but is provided as an example of a display mechanism.

In addition, the cross-tab report may be displayed as a 3-Dimensional graph by representing the numeric values in the fact cells as heights in a 3D graph. Furthermore, the cross-tab report may also be used to form a Bar or Horizontal Bar Chart. A Bar Chart is formed by using only Top labels, displayed along the bottom of the chart rather than the top, and representing the fact values as a height of the bars. Similarly, a Horizontal Bar Chart is formed by using only side labels and representing the fact values as lengths in the chart.

At the Block 310 the user may choose either to return to adding or removing labels and facts, to move labels, or to accept the finished cross tab report. At the Block 311 a label is moved within the cross-tab report. The same mechanism is used for moving a label from the top to the side, the side to the top, or within the side or top label area. Note that moving a label does not require re-scanning the data stream. The label is moved by moving the level of nodes in the main and cross trees that represent this label to the desired new location in the respective trees. The routine PvTbl_LabelMove beginning on page 55 of Appendix B demonstrates this process.

The process is completed at the Block 312. The report is accepted as finished by the user. The underlying data structures which are used to generate the report may then be stored to disk. The storage will include the aggregate information stored in each of the cells. Disk storage is used in order to allow the user to reload the cross-tab report without needing to reload the data. However, the disk storage of the pivot trees is also used as a very fast data warehouse where only aggregate cross-tab report data is needed. Queries to the data warehouse need only rearrange the tree to match the structure of the query and then trace from the root of the tree to the node until the desired cell's aggregate data is read.

Enhancements
The Cross Tab Tree in Matrix Form

The relation form of the cross-tab tree is actually a 2-dimensional matrix. Therefore, the corresponding cross-tab tree structure may also be represented by a unique 2-dimensional matrix. The matrix's structure is such that each level of the tree, as described above, is a column in the matrix. Each row of the matrix is a unique path from the root to a leaf in the tree. The lowest level of the tree is the left most column in the matrix. The root need not have its own column since the root always has exactly one value. The facts of the cross-tab may be stored in separate columns in the matrix, one column per fact. This is possible because the number of rows in the matrix does not change with a given set of labels. This matrix has a 1 to 1 correspondence with the corresponding cross-tab tree structure. Thus, the matrix is generated from the tree and the tree may be generated from the matrix.

Because this matrix has a 1—1 correspondence with the cross tab tree, it may be considered as an alternate representation of the tree. The same principle of reordering the cross-tab report by rearranging the levels of the tree applies to the matrix. The cross-tab report is rearranged by reordering the columns in the matrix and then resorting the columns which have been moved. Aggregate data is read from the matrix by reading the fact values within the matrix.

Furthermore, the matrix may be used as a companion data structure to the corresponding cross-tab tree by storing pointers to the tree nodes in the matrix. The matrix is then reordered when the report is rearranged and the changed levels of the tree are regenerated from the matrix. This method facilitates in-place reordering of the tree as preferred by the present invention.

Additionally, the matrix may also be used to store the tree to disk. The matrix need not contain pointers, which are difficult to store to disk because they are usually transient in memory. Therefore, the matrix may be written to disk, then read back and used to regenerate the tree if desired.

The Cross Tab Tree in N Dimensions

An alternate way to consider the method described above is to consider that it sorts data in 3 dimensions. In this mode, the Side, Top, and Z Labels each represent a dimension of the data. Multiple Side, Top, and Z labels may be considered to represent composite coordinates that specify a single value in the specified dimension. The method as demonstrated in Appendix B handles these 3 dimensions.

However, the concepts described above may be extended to an arbitrary number N of dimensions. To implement an N-dimensional cross tab, the main pivot tree is formed as described above, including a series of levels of nodes for each of the desired dimensions. In addition, separate cross trees are built depending on the display criteria required for the various dimensions.

In 3 dimensions the main tree is formed with Z labels, Side labels, and then Top labels. The corresponding cross tree contains node levels for the Z labels and then the Top labels. The purpose of the cross tree is to facilitate display of the correct Top labels and aggregate totals for the columns represented by the top labels.

An example 4-dimensional cross-tab report and corresponding tree structure might have Side, Top, Z, and Time labels. The desired display of the data might then be an animated cross-tab report, where the values in the chart varied with time. The master tree would have Z, Time, Side and Top labels. Only a single cross tree is then necessary. This cross tree would contain the Z, Time, and Top labels. Values are then accessed for a given sheet in a given time and displayed under the appropriate side and top labels.

In alternate 4-dimensional or higher dimensional cross-tab reports and corresponding tree structures, different cross trees are chosen based upon which label types must be grouped independently. Furthermore, the structure of the main tree is varied based upon the access criteria.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

Edit Menu

Auto Paste Link Refresh

When checked, Auto Paste Link Refresh will automatically get new editions of the linked data when they are available.

Paste Link Refresh

Paste Link Refresh will get a new edition of the linked data when selected.

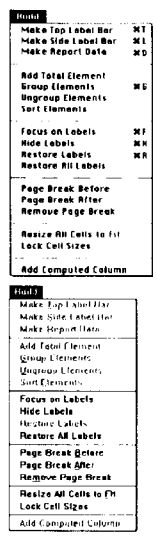
Build Menu
The Build menu lets users control the structure and layout of the report and provides control over the Source window as well. Many of the commands in the Build menu can be invoked by using the buttons in the Icon bar.

DataPivot Reference & r's Guide

Make Top Label Bar

This command extracts a selected column of data from the Source window and adds it to the report as a new level of Top Label Bars.

Labels will appear sorted in ascending order across the top of the report. Each new source element added is called a level of the Top Label Bar. To add more than one level of labels at a time, shift-click to select multiple columns in the Source window, then use the Make Top Label Bar command or click the Top Labels icon button.

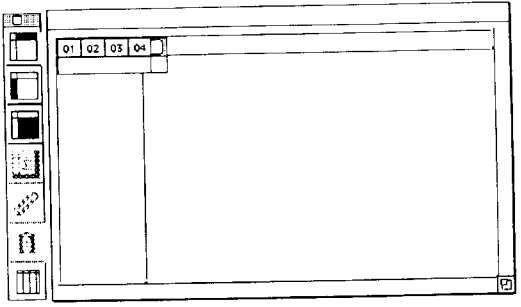

If there are already top labels in the report, the level added with the Make Top Label Bar command (or the icon button) will appear below all other Top Label levels. Limits in effect on the Source column will be reflected in the labels actually displayed in the report.

Each column in the Source window can only be used as a Label Bar once. After a top label has been added, it can be pivoted to the side, but it cannot be added from the Source again.

Note: The Make Top Label Bar command performs the same function as the Top Labels icon button.

Build Menu

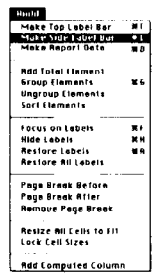

Make Side Label Bar

This command extracts a selected column of data from the Source window and adds it to the report as a new level of Side Label Bars.

Labels will appear sorted in ascending order down the side of the report. Each new source element added is called a new level of the Side Label Bar. To add more than one level of labels at a time, shift-click to select multiple columns in the Source window, then use the Make Side Label Bar command or click the Side Labels icon button.

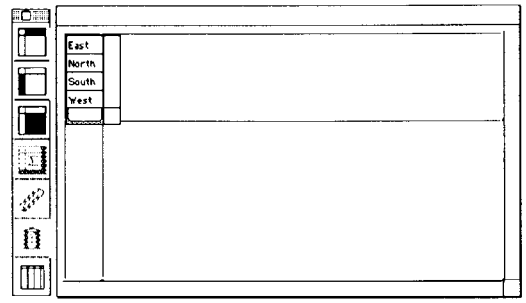

If there are already side labels in the report, the level added with the Make Side Label Bar command (or the icon button) will appear to the right of all other Side Label levels. Limits in effect on the source column will be reflected in the labels actually displayed in the report.

Each column in the Source window can only be used as a Label Bar once. After a side label has been added, it can be pivoted to the top, but it cannot be added from the Source again.

Note: The Make Side Label Bar command performs the same function as the Side Labels icon button.

DataPivot Reference & 's Guide

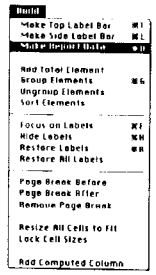

Make Report Data

This command extracts a column of data from the Source window and adds it to the report as a Report Data element.

All Report Data elements are part of the same level; each new element is added next to the other Report Data elements. Report Data elements are the "facts" associated with the top and side labels in the report—the body of the report. DataPivot populates the data area of the report by scanning the source data, looking up values and aggregating the data together into "buckets" defined by the top and side labels. DataPivot's default is to sum the values that comprise each cell, but other functions can be specified with the Formula gadget.

|       | Q1       | Q2       | Q3       | Q4       |
|-------|----------|----------|----------|----------|
|       | Sales    | Sales    | Sales    | Sales    |
| East  | $569,280 | $581,424 | $604,500 | $611,493 |
| North | $572,380 | $590,367 | $609,410 | $627,607 |
| South | $387,832 | $391,859 | $390,742 | $422,599 |
| West  | $384,230 | $392,010 | $397,109 | $414,782 |

The first time a Report Data element is added, the name of the element (the column heading in the Source window) will appear either at the top or side label bar of the Report, depending on the item checked in the Preferences menu. All subsequent data labels added will be placed in the same level, on the same axis as the first data label.

Unlike Top and Side Labels, a Source column can be used as Report Data many times. Each occurrence of the column can be defined by a formula in the Formula gadget. For example, a single data element can appear simultaneously in the report as a sum, percentage, and count.

Note: The Make Report Data command performs the same function as the Report Data icon button.

See also

- Gadget : Formula

Build Menu

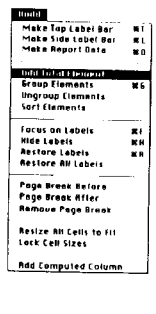

Add Total Element

This command places a summary statistic at a particular level of the report. Select a Top or Side Label level prior to using the Add Total Element command.

|      | Q1        | Q2        | Q3        | Q4        | TOTAL       |
|------|-----------|-----------|-----------|-----------|-------------|
|      | Sales     | Sales     | Sales     | Sales     | Sales       |
| East | $569,280  | $581,424  | $604,500  | $611,493  | $2,366,697  |
| North| $572,380  | $590,367  | $609,410  | $627,607  | $2,399,764  |
| South| $387,832  | $391,859  | $390,742  | $422,599  | $1,593,032  |
| West | $384,230  | $392,010  | $397,109  | $414,782  | $1,588,131  |

Totals created by DataPivot are 'Smart Totals'—they apply an intelligent aggregate of the function specified. For example, the total of an average will average the Source data, it does not sum the averages displayed.

DataPivot adds the Total as the last item in the Label Bar, grouped by any outer levels present. To move a total, select the Total item and drag it into position. Clicking and dragging the Total label is equivalent to performing a manual sort.

Use the Add Total Element command to add computed elements to a Label Bar that can later be converted to other formulas such as increase, average, etc.

Any Total Element can be removed from the report with the Remove icon button.

Note: The Add Total Element command performs the same function as the Total icon button.

See also

- Gadget : Formula

DataPivot Reference & User Guide

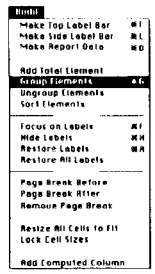

Group Elements

When two or more labels from a Top or Side Label level are selected, this command combines them into a single group.

To add labels to an existing group, select the grouped label, shift-click to select the extra labels to add, and select the Group Elements command or click the Group Icon button.

Select the elements to group...

|       | Q1       | Q2       | Q3       | Q4       | TOTAL       |
|-------|----------|----------|----------|----------|-------------|
|       | Sales    | Sales    | Sales    | Sales    | Sales       |
| East  | $569,280 | $581,424 | $604,500 | $611,493 | $2,366,697  |
| North | $572,380 | $590,367 | $609,410 | $627,607 | $2,399,764  |
| South | $387,832 | $391,859 | $390,742 | $422,599 | $1,593,032  |
| West  | $384,230 | $392,010 | $397,109 | $414,782 | $1,588,131  |

...click the Group icon button... 

...and they become grouped as one element.

|         | Q1         | Q2         | Q3         | Q4         | TOTAL      |
|---------|------------|------------|------------|------------|------------|
|         | Sales      | Sales      | Sales      | Sales      | Sales      |
| ▶ East  | $1,141,660 | $1,171,791 | $1,213,910 | $1,239,100 | $4,766,461 |
| South   | $387,832   | $391,859   | $390,742   | $422,599   | $1,593,032 |
| West    | $384,230   | $392,010   | $397,109   | $414,782   | $1,588,131 |

Note: The Group Elements command performs the same function as the Group icon button.

Build Menu
Ungroup Elements
This command ungroups items that were previously grouped.
Note: A group can also be ungrouped by selecting the group and clicking the Group (paper clip) icon button.

DataPivot Reference & U... Guide

Sort Elements

This command sorts the labels of the selected level in ascending order. The Sort Elements command works on entire levels of labels, rather than on independent elements.

To sort elements in a label bar:

1. Select a label bar by clicking its handle.

Use shift-click to select multiple levels.

2. Choose Sort Elements from the Build menu.

The labels will be sorted in ascending order.

|       | Q1        | Q2        | Q3        | Q4        | TOTAL       |
|-------|-----------|-----------|-----------|-----------|-------------|
|       | Sales     | Sales     | Sales     | Sales     | Sales       |
| East  | $569,280  | $581,424  | $604,500  | $611,493  | $2,366,697  |
| North | $572,380  | $590,367  | $609,410  | $627,607  | $2,399,764  |
| South | $387,832  | $391,859  | $390,742  | $422,599  | $1,593,032  |
| West  | $384,230  | $392,010  | $397,109  | $414,782  | $1,588,131  |

Tip: To sort elements in any order other than ascending, drag elements to their desired position.

See also

Short-cuts and other Tips

Build Menu

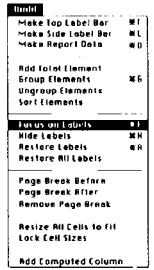

Focus on Labels

Focus on Labels is a direct way of limiting data to certain elements, and has the same effect as using the Limit gadget. Focus on Labels works in the report area while the Limit gadget works in the Source window.

To use Focus on Labels:

1. Select labels to focus on.

Shift-click to select multiple labels.

2. Choose Focus on Labels from the Build menu.

The report will be updated to include only the data associated with the selected labels.

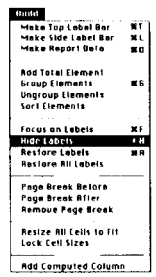

Hide Labels

Hide Labels is a direct way of limiting data to exclude certain elements, and has the same effect as using the Limit gadget. Hide Labels works in the report area while the Limit gadget works in the Source window.

To hide labels:

1. Select labels to hide.

Shift-click to select multiple labels.

2. Choose Hide Labels from the Build menu.

The report will be updated to exclude all of the data associated with the selected labels.

DataPivot Reference & Users Guide

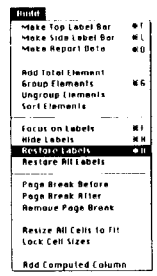

Restore Labels

Restore Labels will reset any level to show all of the labels associated with that level.

To restore labels:

1. Select the levels to be restored.

Shift-select to choose multiple levels.

2. Choose Restore Labels from the Build menu.

The report will be updated to include all of the data for the selected levels.

Restore All Labels

Restore All Labels will reset the report to show all labels in all levels.

Build Menu

Page Break Before

DataPivot will automatically spread a report to as many pages as required based on the page set-up characteristics.

Page break instructions can be inserted at any level of the report. Page Break Before will insert a page break before the selected label(s). A page break appears as a dashed line.

|  | 1991 | | | | | 1992 | | |
|---|---|---|---|---|---|---|---|---|
|  | Q1 | Q2 | Q3 | Q4 | TOTAL | Q1 | Q2 | Q3 |
|  | Sales | Sales | Sales | Sales | Sales | Sales | Sales | Sales |
| East | $246,130 | $255,188 | $269,505 | $277,217 | $1,048,040 | $325,150 | $326,236 | $334,995 |
| North | $303,680 | $318,593 | $330,851 | $344,320 | $1,297,444 | $268,700 | $271,774 | $278,559 |
| South | $224,362 | $227,099 | $222,278 | $239,131 | $912,869 | $163,470 | $164,761 | $168,464 |
| West | $173,860 | $176,225 | $182,605 | $192,142 | $724,832 | $210,370 | $215,785 | $214,504 |

Page Break After

DataPivot will automatically spread a report to as many pages as required based on the page set-up characteristics.

Page break instructions can be inserted at any level of the report. Page Break After will insert a page break after the selected label(s). A page break appears as a dashed line. If the label is in an outer level and has subordinate labels, the page break will be placed after the last subordinate level.

Remove Page Break

This command removes a selected page break.

To select a page break, select the cell that created the page break.

Tip: To simplify removing page breaks, click the label bar handle to select the entire label bar that contains the page break.

DataPivot Reference & User's Guide

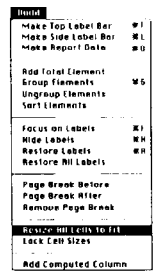

Resize All Cells to Fit

This command will reset all cell sizes to the default size. The default size is the minimum width and height needed to fully display the value in a cell.

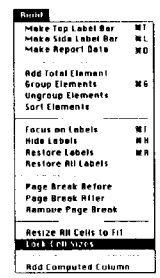

Lock Cell Sizes

This command will lock the cell sizes to the current settings. A cell cannot be resized when cell sizes are locked except with the Resize All Cells to Fit command.

See also

- Build : Resize All Cells to Fit.

Build Menu

Add Computed Column

This command adds a new column to the Source window.

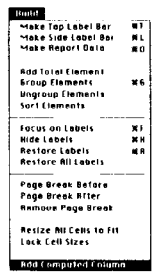

To define the column's formula, use the Formula gadget. DataPivot supports basic arithmetic operations which can be performed on source columns that are referenced by name.

Use the Name gadget to name the new column.

Note: The Source window must be selected before a computed column can be added The screen shots above illustrate adding a computed column to convert sales from actual dollars to thousands of dollars.

See also

- Gadget : Formula Gadget
- Gadget : Name Gadget

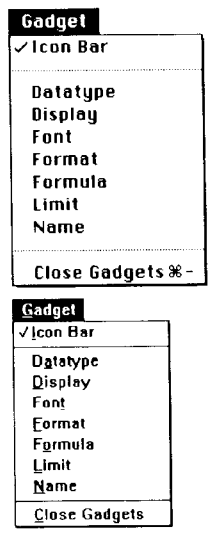
Gadget Menu

Gadgets allow users to view and change the appearance and behavior of objects in a Pivot report and in the Source window. Using gadgets, users can set typeface, style, alignment and display format of items in a report. Gadgets can also define calculations for Report Data elements, change the names of items, place grid lines and limit the source data.

Gadgets follow an object-oriented interface model. Each gadget works only on selected objects. The characteristics of the selected object appear in the gadget window as objects are selected. After changes are made in the gadget, click the Apply button to make the changes in the report.

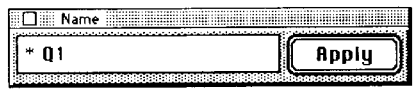

Each gadget is a palette that floats on top of all other windows. Gadgets can be moved or closed like other windows. To move a gadget, position the pointer over the title bar area of the gadget. When the pointer turns into crossed arrows, click and drag the window. To close the gadget, position the crossed arrows over the close box. When the crossed arrows change to a pointer, click the close box.

Containing Gadgets within the Pivot Window

Each gadget is a floating window. It can be dragged and closed independently of the Pivot window. It cannot be re-sized or hidden under other DataPivot windows.

To contain gadgets inside the Pivot window as they are under Microsoft Windows, choose Tear-off Icon Bar from the Preferences menu before opening a report.

General procedure for using gadgets to make changes:

1. Select the object to be manipulated.
2. Choose the gadget from the pull-down menu.
3. Indicate the desired changes.
4. Click the Apply button to make changes.

Icon Bar
If the Icon Bar is closed, this command opens it on the upper left side of the screen on the Macintosh or onto the upper left side of the Pivot window in Windows.
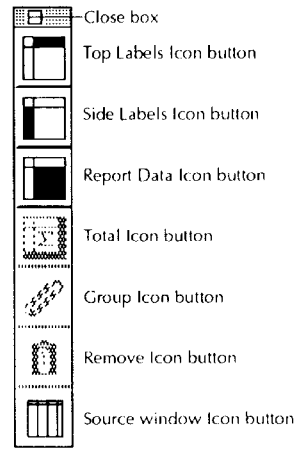

DataPivot Reference & U  Guide

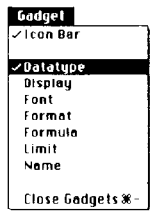

Datatype Gadget

This gadget displays the datatype of the selected source column—String, Number, or Date. Use the Datatype gadget to "fix" the datatype of a date or numeric column that contains strings or null values and was imported into the Source window as a string column. When a column is forced to a date or number datatype, the date or number values in the column will be converted to the selected datatype and the string values will be converted to nulls.

Note: If you attempt to convert a column to a datatype that does not make sense, e.g., a number to a date, DataPivot will convert the entire column to nulls. The only way to restore the values is to reimport the data.

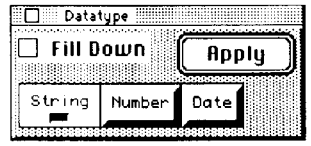

How to change the datatype of a column:

1. Select the column in the source window.
2. Choose Datatype from the Gadget menu.

The current type of the selected column is displayed when the gadget opens.

3. Choose the new type for the column.
4. Click the Apply button to make the change.

The Fill Down button will populate blank cells with the value from the cell above. This is useful when the source data has suppressed repeated values.

Note: The Fill Down command cannot be undone.

Gadget Menu

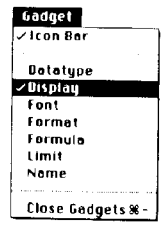

Display Gadget

The Display gadget adds or removes horizontal and vertical grid lines to your report or the source window.

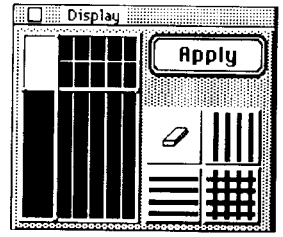

How to control the display of lines:

1. Click on the represented areas of the report (or source) displayed in the gadget window to indicate where the grid lines should be placed.

2. Choose the type of lines (horizontal, vertical, grid, or none).

3. Click the Apply button.

DataPivot Reference & User Guide

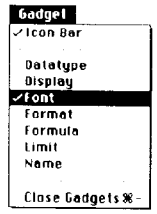

Font Gadget

The Font gadget alters the font type, style, size, and alignment (vertical & horizontal) of any part of the report. This gadget changes the characteristics of text in the report only.

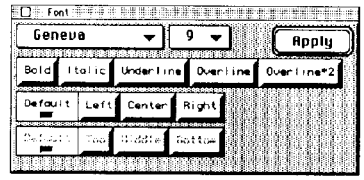

How to change font parameters:

1. Select text in the report.
2. Choose Font from the Gadget menu.

The current characteristics of the selected text are displayed when the Font gadget opens.

3. Indicate the new characteristics needed for the selected text.
4. Click the Apply button to make the changes.

See also

- Font Menu
- Style Menu

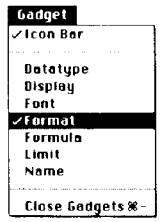

Format Gadget

The Format gadget changes the format of numbers and dates in the report and the Source window.

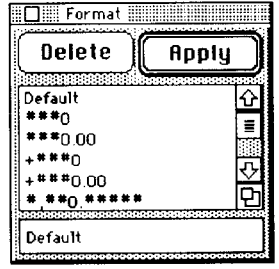

Pre-defined formatting options available are: whole numbers, decimal points, commas, dollar signs, +/- to show profit/loss, percentages, mm/dd/yy and many different combinations of the above. Users can create their own formats by typing directly into the edit area. DataPivot follows standard formatting conventions.

How to set formats:

1. Select the section of the report or the Source column to format.
2. Choose Format from the Gadget menu.
3. Scroll through the list of options to find the format option you desire, or type directly into the text area.
4. Click Apply to make the change.

DataPivot Reference & 's Guide

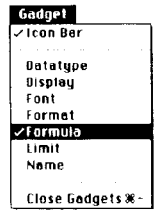

Formula Gadget

The Formula gadget changes the formulas of the Report Data columns in the report or the computed columns added to the Source window.

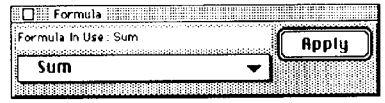

Report Data elements can be defined as any of the formulas provided in the pop-up menu: Sum, Average, Count, Min, Max, % of Column, % of Row, % of Grand, Increase, % Increase, String.

Computed columns can be defined by any simple arithmetic expression involving one or more source data columns and constant values.

Report Data element formulas provided with the gadget:

Formulas use source data directly to calculate results in a Pivot report. Many formulas are computed based on the domain of the source rows associated with each cell in the report. The domain consists of the rows in the Source window that match the criteria specified by each intersection of labels in the Top Label Bar and Side Label Bar. To place a formula on a data set in a report, the report data must be selected.

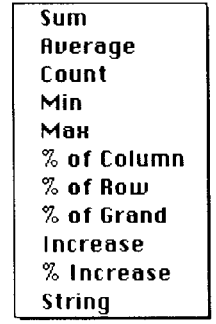

Sum: Adds values in selected element and groups them as specified by the intersection of top and side labels. This is the default function.

Average: Computes the average value in each cell based upon the source data to which the cell refers. DataPivot uses the following process: Sum all values for the selected data element for all the rows in the domain. Then, divide the result by the number of rows in the domain.

Count: Counts the number of rows in the domain.

Min: Returns the minimum value in the domain.

Max: Returns the maximum value in the domain.

Gadget Menu

% of Row: Computes each cell as a percent of the total for the selected element across the row.

% of Column: Computes each cell as a percent of the total for the selected element down the column.

% of Grand: Computes each cell as a percent of the total for the selected element in the entire report (rows and columns).

Increase: Computes the difference between two adjacent labels of a label bar. Increase subtracts the first value (left to right, top to bottom) from the second and displays the result.

Note: Increase only works on total data elements and only when there are exactly 2 elements. First create a total at the correct position in the report, then change its formula to Increase. Increase will not work at the intersection of 2 totals. The cell will be left blank.

% Increase: Computes the percent difference between two labels of a label bar. % Increase subtracts the first value (left to right, top to bottom) from the second and divides the difference by the first value. The result will automatically be displayed as a percent—use the Format gadget to change the format.

Note: % Increase only works on total data elements and only when there are exactly 2 elements. First create a total at the correct position in the report, then change its formula to % Increase. % Increase will not work at the intersection of 2 totals. The cell will be left blank.

String: Displays text in cells, rather than calculated numbers. If the domain of the cell contains only one unique text value, the String function will copy the value from the Source window to the corresponding cell in the data area of the report. If the domain of the cell contains multiple occurrences of the same unique text value (e.g. "Yes"), the String function will copy the value from the Source window to the corresponding cell in the data area of the report.

If the domain of the cell contains multiple occurrences of different text values (e.g. some "Yes" and some "No"), the value in the cell will be based on whether Show "Multiple Possibilities" is checked under the Preferences menu. If the option is on, DataPivot will display the text "Multiple Possibilities" in the cell; if it is off, a comma delimited list of the values will be displayed.

Creating custom formulas for Source window computed columns:

Custom formulas are defined only for computed columns of the Source window. Add a computed column using the command under the Build menu and define the formula using the Formula gadget.

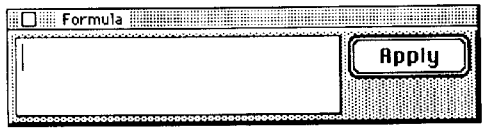

To create custom formulas, reference the names of the column headings in the Source window in one of two ways.

- Reference a column by using the syntax: Column("column name").

- Reference the column by typing the name directly and replacing any special characters with an underscore (_). Special characters are any non-letter, non-number characters, such as *, #, $, as well as spaces. This method will not accept a column name with a special character as the first character.

The arithmetic operators +, -, *, /, string concatenation, and ( ) are supported for computations in the Formula gadget.

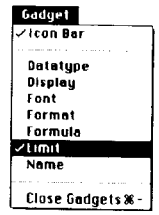

Limit Gadget

Data can be filtered to contain only certain value ranges across one or more columns by using the Limit gadget. This is useful for selecting precisely the data to include in the report. With this gadget, outliers or bad data (e.g. typos, redundant information, etc.) can be excluded from a report.

Another use for this function is sub-setting the data. For instance, the Limit gadget can be used to select only a single year, product, division or city. The Limit gadget works by reducing the source data; it is active only when the Source window is active.

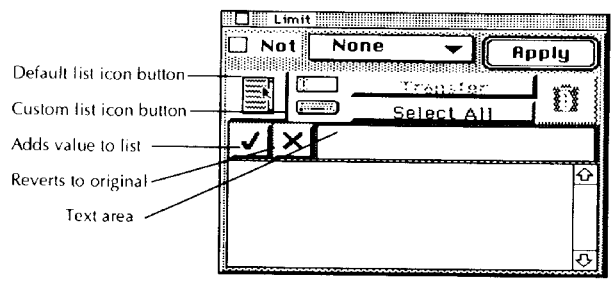

Default list icon button
Custom list icon button
Adds value to list
Reverts to original
Text area

How to limit data:

1. In the Source window, select the column containing the range of data to limit.
2. Choose Limit from the Gadget menu.
3. Enter the specifications to limit the data.

There are two lists that help you enter the specifications— the Default list and the Custom list. If you know the values you want to limit, use the Custom list. For assistance from DataPivot, including a list of valid values, use the Default list.

How to use the Default list:

1. Click the Default List icon button.

A list of all the unique values available in the column is displayed.

2. From the list, select a subset of the available values.

Use the shift-click method to choose more than one value.

Note: The Transfer button transfers selected values from the Default List to the Custom List. This allows the user to subset the original list.

How to use the Custom List:

1. Click the Custom list icon button.
2. Type the specifications in the text box.

Click the [✓] button to enter the text into the Custom List.

Click the [✗] button to revert to original condition.

3. From the Custom list, select a subset of the available choices.

Delete unnecessary criteria by selecting it and clicking the Delete icon button (trash can). To select *all* the criteria entered into the Custom List, use the Select All button.

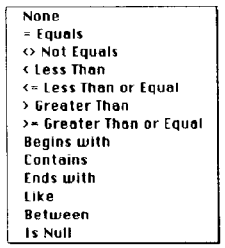

4. Click the operators pop-up menu to get a list of operators.

Some of the operators available are: Equals, Not Equals, Less Than, Less Than or Equal, Greater Than, Greater Than or Equal, Begins with, Contains, Ends with, Like, Between, Is Null.

Note: The operators available in the pop-up menu change depending on the datatype of the selected column.

5. Choose the operator needed to limit the data.
6. Click the Apply button.

Gadget Menu

DataPivot's user interface provides visual indicators wherever possible. The Source window will look different after a limit has been placed. Column titles on limited columns will be bold and the number of available rows will be altered to reflect the limit.

Note: The Focus on Labels, Hide Labels, and Restore Labels options in the Build menu perform the same functions as the Limit gadget.

See also

- Build : Focus on Labels
- Build : Hide Labels

DataPivot Reference & User Guide
Name Gadget
The Name gadget will change the name of any label in the report or new computed columns in the Source window.
How to change the name of a label:
1. Select the label to be changed.
2. Choose Name from the Gadget menu.
3. Type the new name.
4. Click the Apply button.
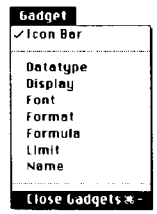
Close Gadgets
This command closes all open gadgets.

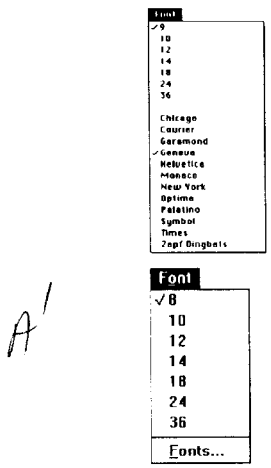
Font Menu
These menu commands are similar to other Macintosh and Microsoft Windows products. The Font menu contains various font types and sizes installed under the current operating system.

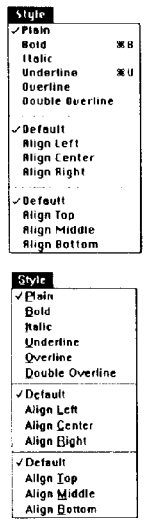

Style Menu

The Style menu commands work on selected objects of a DataPivot Report. These commands will not affect the Source window.

The Plain, Bold, Italic, Underline, Overline, and Double Overline commands change the style of the text.

If you are unfamiliar with the function of these commands, see the documentation that accompanied your computer.

The Align commands are similar to those found in many word processors.

Align Left, Align Right, and Align Center set the horizontal alignment of text in cells. The default aligns numbers on the right and text on the left.

Align Top, Align Middle, and Align Bottom set the vertical alignment of the labels. The default aligns the labels to middle.

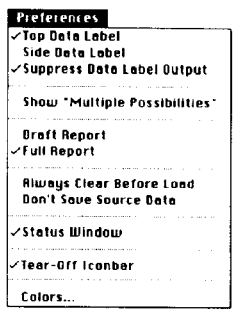
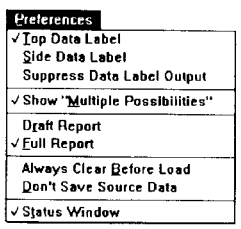
Preferences Menu

DataPivot Reference & Guide

Top Data Labels

This command places the Report Data Labels in the Top Label Bar.

Cases as top labels

|      |       | Q1    | Q2    | Q3    | Q4    | TOTAL |
|------|-------|-------|-------|-------|-------|-------|
|      |       | Cases | Cases | Cases | Cases | Cases |
| 1991 | East  | 1,560 | 1,616 | 1,705 | 1,754 | 6,635 |
|      | North | 1,940 | 2,031 | 2,107 | 2,190 | 8,268 |
|      | South | 1,434 | 1,451 | 1,421 | 1,527 | 5,833 |
|      | West  | 1,095 | 1,110 | 1,150 | 1,209 | 4,564 |
| 1992 | East  | 2,070 | 2,089 | 2,144 | 2,140 | 8,443 |
|      | North | 1,690 | 1,709 | 1,751 | 1,780 | 6,930 |
|      | South | 1,030 | 1,038 | 1,061 | 1,153 | 4,282 |
|      | West  | 1,350 | 1,384 | 1,376 | 1,428 | 5,538 |

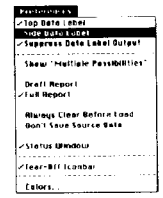

Side Data Labels

This command places the Report Data Labels in the Side Label Bar.

Cases as side labels

|      |       |       | Q1    | Q2    | Q3    | Q4    | TOTAL |
|------|-------|-------|-------|-------|-------|-------|-------|
| 1991 | East  | Cases | 1,560 | 1,616 | 1,705 | 1,754 | 6,635 |
|      | North | Cases | 1,940 | 2,031 | 2,107 | 2,190 | 8,268 |
|      | South | Cases | 1,434 | 1,451 | 1,421 | 1,527 | 5,833 |
|      | West  | Cases | 1,095 | 1,110 | 1,150 | 1,209 | 4,564 |
| 1992 | East  | Cases | 2,070 | 2,089 | 2,144 | 2,140 | 8,443 |
|      | North | Cases | 1,690 | 1,709 | 1,751 | 1,780 | 6,930 |
|      | South | Cases | 1,030 | 1,038 | 1,061 | 1,153 | 4,282 |
|      | West  | Cases | 1,350 | 1,384 | 1,376 | 1,428 | 5,538 |

Preferences Menu

Suppress Data Label Output

This command will suppress the labels of data elements when the report is output to either the printer or a file, i.e., copied, printed or exported. The data labels will always be shown on the screen, but will not appear in any printouts or exports when the command is activated.

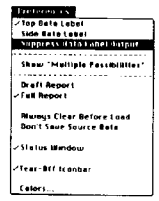

Pivot report output to Microsoft Excel with "Suppress Data Label Output" on

DataPivot Reference & 's Guide

Show "Multiple Possibilities"

This command controls how report data is displayed when its formula is defined as String. If the domain of the cell contains only one unique text value, the String function will copy the value from the Source window to its corresponding cell in the data area of the report. If the domain of the cell contains multiple occurrences of the same unique text value (e.g. "Yes", "Yes"), the String function will copy the value from the Source window to its corresponding cell in the data area of the report.

If the domain of the cell contains multiple occurrences of different text values (e.g. some "Yes" and some "No"), the value in the cell will be based on whether Show "Multiple Possibilities" is checked. If the option is on, DataPivot will display the text "!Multiple Possibilities" in the cell; if it is off, a comma delimited list of the values will be displayed.

Show "Multiple Possibilities" off

|   |   | Q1 | Q2 | Q3 | Q4 |
|---|---|---|---|---|---|
|   |   | Winery | Winery | Winery | Winery |
| 1991 | Cabernet Sauvignon | Beaulieu | Beaulieu | Beaulieu | Beaulieu |
|   | Chardonnay | Beaulieu | Beaulieu | Beaulieu | Beaulieu |
|   | Merlot | Duckhorn, Beaulieu | Duckhorn, Beaulieu | Duckhorn, Beaulieu | Duckhorn, Beaulieu |
| 1992 | Cabernet Sauvignon | Beaulieu | Beaulieu | Beaulieu | Beaulieu |
|   | Chardonnay | Beaulieu | Beaulieu | Beaulieu | Beaulieu |
|   | Merlot | Beaulieu, Duckhorn | Duckhorn, Beaulieu | Beaulieu, Duckhorn | Duckhorn, Beaulieu |

Show "Multiple Possibilities" on

|   |   | Q1 | Q2 | Q3 | Q4 |
|---|---|---|---|---|---|
|   |   | Winery | Winery | Winery | Winery |
| 1991 | Cabernet Sauvignon | Beaulieu | Beaulieu | Beaulieu | Beaulieu |
|   | Chardonnay | Beaulieu | Beaulieu | Beaulieu | Beaulieu |
|   | Merlot | !Multiple Possibilities | !Multiple Possibilities | !Multiple Possibilities | !Multiple Possibilities |
| 1992 | Cabernet Sauvignon | Beaulieu | Beaulieu | Beaulieu | Beaulieu |
|   | Chardonnay | Beaulieu | Beaulieu | Beaulieu | Beaulieu |
|   | Merlot | !Multiple Possibilities | !Multiple Possibilities | !Multiple Possibilities | !Multiple Possibilities |

Preferences Menu

Draft Report

When this command is activated, the Report Data area of the report is not displayed and associations between the inner and outer levels of the report are not shown. In Draft mode, DataPivot responds more quickly when adding and rearranging labels and Label Bars.

|  |  | Q1 | Q2 | Q3 | Q4 |
|---|---|---|---|---|---|
|  |  | Winery |  |  |  |
| 1991 | Cabernet Sauvignon |  |  |  |  |
| 1992 | Chardonnay |  |  |  |  |
|  | Merlot |  |  |  |  |

Note: Under low memory conditions, users will be prompted to switch to draft mode.

Full Report

This command displays the Report Data area of the report and the correct hierarchical relationship between the inner and outer levels of Label Bars.

|  |  | Q1 | Q2 | Q3 | Q4 |
|---|---|---|---|---|---|
|  |  | Winery | Winery | Winery | Winery |
| 1991 | Cabernet Sauvignon | Beaulieu | Beaulieu | Beaulieu | Beaulieu |
|  | Chardonnay | Beaulieu | Beaulieu | Beaulieu | Beaulieu |
|  | Merlot | Duckhorn, Beaulieu | Duckhorn, Beaulieu | Duckhorn, Beaulieu | Duckhorn, Beaulieu |
| 1992 | Cabernet Sauvignon | Beaulieu | Beaulieu | Beaulieu | Beaulieu |
|  | Chardonnay | Beaulieu | Beaulieu | Beaulieu | Beaulieu |
|  | Merlot | Beaulieu, Duckhorn | Duckhorn, Beaulieu | Beaulieu, Duckhorn | Duckhorn, Beaulieu |

DataPivot Reference & Users Guide

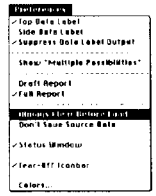

Always Clear Before Load

This command determines whether current source data is cleared before new source data is imported, in order to free memory. If this option is on, DataPivot will clear the current source from RAM before importing new data. If this option is off, DataPivot will keep the old data in memory until new data has been imported successfully.

Note: If the Always Clear Before Load option is on and the import fails, the original source data cannot be recovered from RAM and the Source window will be empty until new data has been successfully reimported.

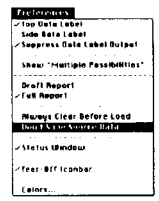

Don't Save Source Data

This command determines whether the source data is saved with the report during a Save or Save as command. In order to save memory or eliminate confusion about out-of-date data, it may be preferable to save the report without source data. The structure of the source data is remembered, however, and when a new set of data is imported, the DataPivot report will reflect those new values automatically.

Preferences Menu

Status Window

If you wish to suppress the DataPivot status windows from view, use this command. The command specifies whether the status window is displayed during DataPivot calculations. It has no effect on the application other than display.

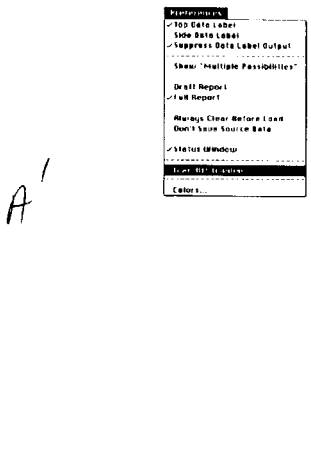

◆ Tear-off Icon Bar

When this option is on, the Icon Bar and gadgets are free floating palettes. With this command off, they are contained in the Pivot window. This command is active only when there is no DataPivot document open.

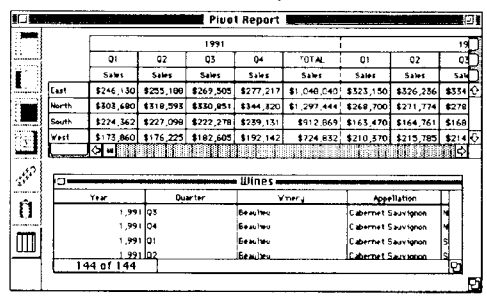

DataPivot Reference & 's Guide

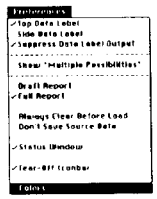

Colors...

The Color Options dialog box adjusts the display colors on color Macintosh systems. Each mode assigns different colors to different parts of the document.

- Document Windows: adjusts display colors for the windows.
- Small Windows: adjusts display colors for the sub windows.
- Status Windows: adjusts display colors for messages.
- Dialog Boxes: adjusts display colors for dialog boxes.

Assign different colors to different parts of the window, and make different color assignments for each of the four categories of windows using this dialog box.

Color settings are saved separately from the document allowing users to use the same color set with different documents.

Choosing colors

Choose a color class (Document Windows, Small Windows, Status Windows, Dialog Boxes), select a window area and choose a color by clicking in the color cubes or in the vertical grey bar. Click OK to exit and keep the new colors, or Cancel to discard the altered colors.

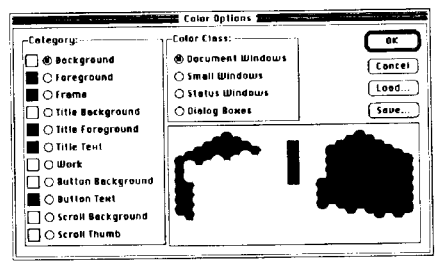

Preferences Menu

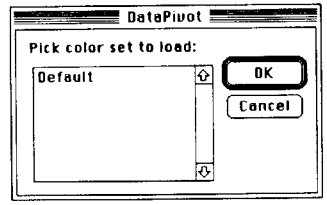

Loading colors

Loads a predefined color set.

The Load Colors dialog box opens, listing all available color sets. Choose a color set and click OK.

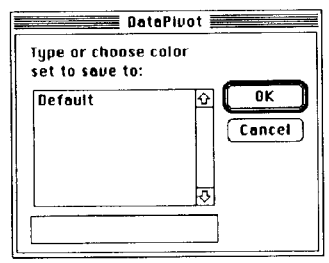

Saving colors

Saves current color settings.

The Save Colors dialog box opens, listing all available color sets. The color set named Default is the one that will be used every time DataPivot is opened. Type or select a name to save as and click OK.

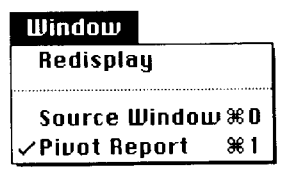
Window Menu
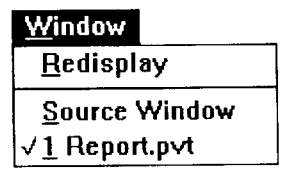
A'

Redisplay

This command redraws the screen.

Source Window

This command reveals the Source window. If the Source window is closed, this command will open it.

Close the Source window at any time by clicking its close box.

Note: The Source window command performs the same function as the Source window icon button.

Document Window

This command displays the current DataPivot document window. The menu choice contains the name of the document. If the document has not yet been saved, it will be displayed as "untitled."

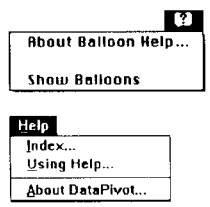
Help Menu

DataPivot Reference User's Guide

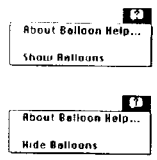

Macintosh Help

Some help is available for Macintosh System 7 users through Balloon Help. With Balloon Help on, when the cursor passes over an item, a small balloon containing a description of the item is displayed.

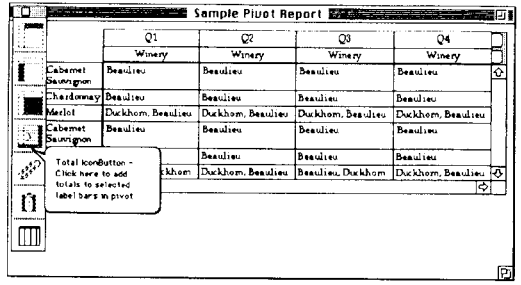

Balloon Help can be turned on at any time, even when a dialog box is open. With Balloon Help on, the Macintosh performs as usual.

To turn on Balloon Help:

- Choose Show Balloons from the Help menu

To turn off Balloon Help:

- Choose Hide Balloons from the Help menu

Help Menu

Microsoft Windows Help

Help is available for Microsoft Windows users through the Microsoft Windows Help system.

The organization of the DataPivot Help file is similar to the reference section of this manual. Keywords are provided for easy lookup of information. Jumps are available to provide additional information on a related topic.

Choose Index from the Help menu to access the help system.

For information on using the help system, see the Microsoft Windows documentation.

DataPivot Scripting

Controlling DataPivot From Other Applications

The process of transparently controlling DataPivot from other applications significantly extends the range of possibilities available for the customized integration of the tools on your desktop. Whether adding a button to update the information in a chart or spreadsheet or building a complete EIS solution, DataPivot can act as the data analysis engine to build synergy between your applications and the way you work.

Controlling DataPivot from other applications is done through scripting. Simply put, DataPivot scripting is the process of transparently sending commands to DataPivot from another application's script, macro, or programming language. The commands sent to DataPivot can range from simple instructions to open and output a DataPivot report, all the way to complex script sequences of building a report from scratch by sending commands to simulate the visual process of report construction.

Sending Commands

The following sections discuss how to get started with DataPivot scripting. Refer to the end of this chapter for a complete list of DataPivot script commands and their syntax.

Microsoft Windows

DataPivot uses Dynamic Data Exchange (DDE) as the mechanism for passing script commands into DataPivot. Before script commands can be sent, the DDE channel must be established from your source application to DataPivot. Opening a DDE channel involves two commands (the sample commands use the Microsoft Excel syntax; other languages will have similar commands, but may use slightly different syntax):

EXEC("PIVOT COMMAND",2)

INITIATE("PIVOT", "COMMAND")

DataPivot Scripting

The first command launches DataPivot. In this example, the parameter 2 instructs Windows to open DataPivot in minimized mode. The second command actually establishes the DDE channel to the DataPivot topic 'COMMAND'. The INITIATE command returns a value, the channel number, which is used in all following DDE commands to identify to which application to send the command.

When the DDE channel is open, the command to send instructions to DataPivot is:

EXECUTE(DDEChannel, "pivot command")

where DDEChannel is the variable name holding the value returned from the INITIATE command, with the DataPivot command enclosed in double quotes.

Once open, commands may flow freely down the DDE channel to DataPivot until you specifically ask to close the channel. To close the DDE channel, use the command:

TERMINATE(DDEChannel).

The EXEC and INITIATE commands need to be issued only once during each DDE session, as does the TERMINATE command to close the session. As many EXECUTE commands as required can be issued in between.

Macintosh

Macintosh applications send commands to DataPivot via a small code resource supplied by Brio Technology. A customized code resource is required for each application which will be sending commands to DataPivot. Currently, Brio is providing code resources for Microsoft Excel and Claris Hypercard. Passing commands is very straightforward, with one command handling the complete interaction with DataPivot. Specific examples of how to invoke DataPivot from other applications are illustrated in the next sections.

Note: In order for scripting to work in Excel, your macro sheet MUST contain the code resources installed in the add-ins BRIO3.XLA or BRIO4.XLA. Make a copy DataPivot Reference & U    Guide of the add-ins if you wish to use a new sheet for scripting and not use the add-ins provided. You can use ResEdit to copy the resources into a new macro sheet.

Note: Copying the add-ins onto a DOS floppy or hard disk will destroy its code resources-- rendering the add-in useless on the Macintosh.

Microsoft Excel for Macintosh and Windows

BRIO.XLA files

Provided with DataPivot are Excel Add-ins (a special form of Excel Macro) that make sending commands to DataPivot quick and easy. The add-ins are named BRIO3.XLA and BRIO4.XLA. They are separate for Excel 3.0 and Excel 4.0. A BRIO.XLA add-in can be loaded when you need it by simply opening it, or more conveniently, the add-in can be automatically loaded every time you start Excel. To have the add-in automatically load, do the following:

- Excel 4.0 for Macintosh—place BRIO4.XLA in the folder 'System Folder:Preferences:Excel Startup Folder (4)'
- Excel 4.0 for Windows—place BRIO4.XLA in the XLSTART directory inside the Excel directory.
- Excel 3.0 for Macintosh—place BRIO3.XLA in the folder 'System Folder:Preferences:Excel Startup Folder'
- Excel 3.0 for Windows—place BRIO3.XLA in the XLSTART directory inside the Excel directory

New Macro Commands

Once the BRIO.XLA add-in is loaded, three new macro commands will be available.

=DataPivot("pivot command")

This command is used to pass script commands into DataPivot.

DataPivot Scripting

For Windows users, this command first checks if DataPivot is open and has a DDE channel already. If not, it will launch DataPivot in minimized mode and open a DDE channel automatically. By using this command, you do not need to code your own EXEC and INITIATE commands.

For Macintosh users, this command handles opening DataPivot (if it is not already open) and sending the command to it.

An example sequence using this command to open a report, reimport the data, copy the report to the clipboard, and close the report would be:

=DataPivot("open (DataPivot, 'c:\apps\Pivot\sample.pvt')")

=DataPivot("import (source, 'c:\apps\Pivot\wines.xls')")

=DataPivot("copy (pivot)")

=DataPivot("close (DataPivot)")

=DataPivotStartMaximized()

This command opens DataPivot in a maximized window (the regular =DataPivot() command opens DataPivot in a minimized window). Script commands are subsequently passed to DataPivot through the =DataPivot() command.

=DataPivotExit()

This command is used to exit DataPivot. It issues a quit (DataPivot) command to close the application. For Windows users, the command also terminates the DDE channel.

Microsoft Word for Windows

DataPivot script commands are sent from Word for Windows via the standard WordBasic DDE Macro commands. The three commands to use are DDEInitiate, DDEExecute, and DDETerminate. A sample sequence of commands follows (refer to the WordBasic manual for full details on the syntax of these commands):

- ChanNum = DDEInitiate("pivot", "command")

This command opens the DDE Channel from Word to

DataPivot Reference & U's Guide

DataPivot. The command will return the DDE Channel number, storing it in a variable named ChanNum.

- DDEExecute ChanNum, "open(pivot, 'c:\pivot\sample.pvt')"
- DDEExecute ChanNum, "import (source, 'c:\apps\Pivot\wines.xls'"
- DDEExecute ChanNum, "copy (pivot)"
- DDEExecute ChanNum, "quit (DataPivot)"

The execute command sends the DataPivot script command down the channel referenced by the ChanNum variable. Many execute commands can be sent through the same DDE Channel.

- DDETerminate ChanNum

The terminate command ends the DDE connection to the application at the end of the channel referenced by the ChanNum variable.

Borland Quattro Pro for Windows

DataPivot script commands are sent from Quattro Pro via the standard Quattro DDE Macro commands. The four commands to use are: Exec, Initiate, Execute, and Terminate. A sample sequence of command follows (refer to the Quattro Pro manual for full details on the syntax of these commands):

- {exec "pivot.exe",2}

This command launches the application, in this example name Pivot.exe. The directory where this file is stored must be included in your DOS path statement. The number 2 instructs DataPivot to be opened in minimized mode.

- {initiate "pivot", "command", DDEChannel}

This command opens the DDE Channel from Quattro to DataPivot. The command will return the DDE Channel number, storing it in a variable named DDEChannel.

- {execute DDEChannel, "open(pivot,

DataPivot Scripting

'c:\pivot\sample.pvt')"}
- {execute DDEChannel, "import (source, 'c:\apps\Pivot\wines.xls'")}
- {execute DDEChannel, "copy (pivot)"}
- {execute DDEChannel, "quit (DataPivot)"}

The execute command sends the DataPivot script command down the channel referenced by the DDEChannel variable. Many execute commands can be sent in a row to the same DDEChannel.

- {terminate DDEChannel}

The terminate commands ends the DDE connection to the application at the end of the channel referenced by the DDEChannel variable.

Lotus 123 for Windows

Please consult your Lotus 1-2-3 documentation for information regarding DDE.

DataPivot Reference & 's Guide

Script Commands

DataPivot's scripting language works in the following form:

- Syntax: VERB (OBJECT, ARGUMENTS)
- Statements that contain a period (.), comma (,), or space should be contained in single quotes, e.g., 'FILE.PVT', 'Wine Sales'.
- Italicized statements are OPTIONAL.
- Scripts have a maximum limit of 256 characters per statement.

This section details each verb (or function) and its functionality. Examples are provided for each one.

DataPivot Scripting

Object: DATAPIVOT

The DataPivot object refers to the application.

Verb: NEW
Arguments: File Name

Opens and names a new DataPivot file.

Example (Win): New(DataPivot, 'C:\PIVOT\NEWFILE.PVT')

Example (Mac): New(DataPivot, 'HardDisk:Pivot:New File')

Verb: OPEN
Arguments: File Name

Opens an existing DataPivot file. On Windows, if no file is specified, the user is prompted with the Open dialog box.

Example (Win): Open(DataPivot, 'C:\PIVOT\FILE.PVT')

Example (Mac): Open(DataPivot, 'HardDisk:Pivot:My File')

Verb: QUIT
Arguments: None

Quits DataPivot

Example: Quit(DataPivot)

Verb: CLOSE
Arguments: None

Closes the active Pivot document.

Example: Close(DataPivot)

Verb: HIDE
Arguments: DataLabels

Instructs DataPivot to not include the data labels on output.

Example: Hide(DataPivot, DataLabels)

DataPivot Reference User's Guide

Object: PIVOT

The Pivot object refers to the report.

| | |
|---|---|
| Verb: | COPY |
| Arguments: | None |

Copies to the Clipboard the information in the main Pivot Window.

Example: Copy(Pivot)

| | |
|---|---|
| Verb: | DELETE |
| Arguments: | SourceColumn |

Removes the specified column from the Pivot report.

Example: Delete(Pivot, Quarter)

| | |
|---|---|
| Verb: | EXPORT |
| Arguments: | FileName, ExportType |

Exports the Pivot report to the FileName indicated. Optional argument ExportType indicates the format of the export file including:

- TXT: tab delimited text
- PVT: DataPivot format
- XLS: Excel format
- 123: Lotus 1-2-3 format
- SYK: SYLK format
- CSV: comma delimited text

Example: Export(Pivot, 'EXCEL.XLS', XLS)

| | |
|---|---|
| Verb: | MOVE |
| Arguments: | SourceColumn, position |

Moves the location of a source column to a new position. Position includes ROW1, COL1, ROW2, COL2, etc.; the DataPivot Scripting higher the number, the deeper that column is embedded into the report.

Example:  Move(Pivot, Quarter, ROW2)

Verb: NEWROWFACT
Arguments: SourceColumn

Inserts a column from the source window in the data or fact section of the Pivot report. The heading will be a row header or side label.

Example:  NEWROWFACT(Pivot, Sales)

Verb: NEWCOLFACT
Arguments: SourceColumn

Inserts a column from the source window in the data or fact section of the Pivot report. The heading will be a column header or top label.

Example:  NEWCOLFACT(Pivot, Sales)

Verb: NEWROWLABEL
Arguments: SourceColumn

Inserts a column from the source window as a row header or side label in the Pivot report.

Example:  NEWROWLABEL(Pivot, Quarter)

Verb: NEWCOLLABEL
Arguments: SourceColumn

Inserts a column from the source window as a column header or top label in the Pivot report.

Example:  NEWCOLLABEL(Pivot, Quarter)

DataPivot Reference & ... s Guide

Object: SOURCE

The Source object refers to the Source window.

| | |
|---|---|
| Verb: | COPY |
| Arguments: | None |

Copies the information in the Source window to the Clipboard.

Example: Copy(Source)

| | |
|---|---|
| Verb: | IMPORT |
| Arguments: | FileName |

Imports the specified file into the source window. On Windows, if no file name is specified, the user is prompted to select a file with the DataPivot Import dialog box.

Example (Win): Import(Source, 'C:\PIVOT\Data.xls')

Example (Mac): Import(Source, 'Hard Drive:DataPivot Folder:Excel Data')

| | |
|---|---|
| Verb: | NEWCOMPCOL |
| Arguments: | Name, Definition |

Creates a new column in the Source window based on the name and definition.

Example: NewCompCol(Source, Revenue, 'Sales*Units')

| | |
|---|---|
| Verb: | PASTE |
| Arguments: | None |

Pastes data from the Clipboard to the Source window.

Example: Paste(Source)

DataPivot Scripting

Object: LIMIT(Source Column)

The Limit(Source Column) object refers to a source column limit.

Verb: SET

Arguments: (Operator, Values)

Creates a limit on the specified source column using the operator and values indicated.

Operators include =, <>, <, <=, >, >=, Begins, Contains, Ends, Like, Between, Null.

Example: Set(Limit(Emp), (=, Jones, Smith, Powell))

Verb: CLEAR

Arguments: None

Clears a limit on specified source column.

Example: Clear(Limit(Emp))

Sample script

The following example performs the following steps:

1. OPEN(DATAPIVOT, 'Sample Pivot')

Opens the DataPivot file 'Sample Pivot'

2. IMPORT(SOURCE, Wines.xls')

Imports the source file 'Wines.XLS'

3. NEWROWLABEL(PIVOT, Year)

Adds the Year column as a new Side Label

4. NEWCOLLABEL(PIVOT, Region)

Adds the Region column as a new Top Label

5. NEWCOMPCOL(SOURCE, 'Computed Sales', 'Cost_Per_Case * Cases_Sold')

Adds a computed column to the Source, 'Computed Sales', defined as Cost_Per_Case*Cases_Sold 6. NEWCOLFACT(PIVOT, 'Computed Sales')

Adds new column as report data with top data labels

7. SET(LIMIT(Region), =, North)

Sets a limit on the Region column equal to 'North'

8. CLEAR(LIMIT(Region))

Clears the limit

9. MOVE(PIVOT, Region, ROW1)

Pivots the Region labels from the Top Label Bar to the outer level of the Side Label Bar 10. EXPORT(DATAPIVOT, 'Wine Sales', XLS)

Exports the report to file 'Wine Sales' in XLS format

11. CLOSE(DATAPIVOT)

Closes the DataPivot report

12. QUIT(DATAPIVOT, SILENT)

Quits DataPivot without asking to save changes

Short-cuts and other Tips

Selecting data and its related label in the report

Press the Option key on Macintosh or the Ctrl key in Windows while clicking on the data or the related label.

Selecting columns vs. rows

When the cursor is positioned over a cell, clicking will select either the entire row containing the cell or the entire column, depending on where in the cell the cursor is located during the click.

Imagine each cell has an imaginary diagonal line from the lower left corner to the upper right corner. Clicking above the line will select the row; below the line will select the column.

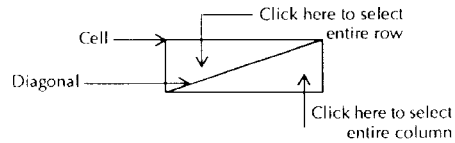

Selecting multiple objects

After selecting the first object, press the Shift key while selecting the second object. Use this command to select multiple columns in the Source window or to select several items to manipulate at once.

To resize entries

1. Click the cell to be resized or the handle to resize a whole level of labels.
2. Move the cursor to the border of the selection until it turns into a two-headed arrow. Resize either the height or the width this way.
3. Click and drag the border to resize the selection.
4. Holding down the Option key for Macintosh or the Ctrl key for Windows while resizing either width or height will cause the other dimension to automatically fit the data Short-cuts and other Tips based on the specification for the set dimension; i.e., if the width of "Los Angeles" is resized to be smaller, DataPivot will automatically increase the height of the entry so that "Los Angeles" fits on two lines.

Double-Click behavior

Double-clicking on any part of the Pivot window or the Source window will open most of the gadgets that can be used to modify that section.

Closing Gadgets

To close all open gadgets, use the Close Gadgets command under the Gadget menu. To close a gadget and apply the changes simultaneously, press the Enter or Return key after making the changes.

Changing the order of Data Elements in the Report

To rearrange multiple data elements in the report, click on a report data label and drag it to the new location. The label will move to the new location along with all of its associated data.

Changing the Sort Order

There are 2 ways to change the default sort order of a column.

- Move the labels to the desired position by clicking on them and dragging to the new location.

- To change the sort order on a large column, define the desired sort order in the Source window. To do this, create a new column in your source data that specifies the sort rating for each row in the data set (e.g. 1 for highest priority, then 2, and so on) *before you import the data*.

Build the report to include both the new column specifying the sort order and the actual column to be sorted. The column will be sorted as you specified.

Remove the column that is specifying the sort order from the report by selecting the label and resizing it to very small. The column will no longer be shown in the report.

Troubleshooting

DataPivot Reference 'ser's Guide

When I click and drag items to the Delete icon button (trash can), they don't disappear.

Select the items and click the Delete icon button. Do not drag items to the trash can.

When the data section of the report is selected, and I click the Totals icon button or choose the "Add Total Element" from the build menu, nothing happens.

Totals can be added only when a level is selected. Make sure that only a Top or Side Label level is selected and not the data area of the report.

Sometimes when I select a source column to add as a Top or Side Label Bar, those icon buttons are not available.

The source column may already be in the report as Top Labels, Side Labels or Report data. In one report, a column can be either labels or data, not both. If the column is already a label, it cannot be added again.

DataPivot seems to be running slowly.

If you are working with a very large data set (or limited RAM) you may notice a decline in the speed of the program. If this happens, you can do the following:

- Use the Draft Report option under the Preferences menu when building the structure of the report.
- Close the Source window as soon as the report is built.
- If you have limited RAM and the data sets you import are very large, consider upgrading the amount of RAM in your computer.

Glossary

DataPivot Reference & r's Guide

Aggregate function (noun): Computes a single statistic from groups of rows or columns of data.

BIFF (file type): A spreadsheet file format that is created for the purpose of importing the data into other programs. This format includes information regarding the internal numbers, formats and column widths. Microsoft Excel can export/import files using this format.

Clipboard (noun): An area in the computer's memory that functions as a holding place for what you last cut or copied. Information on the clipboard can be pasted into documents.

Column (noun): A vertical list of data.

Concatenate (verb): Link together or connect.

Cross Tabulation (noun, verb): Converts flat data files into 2 or more dimensions.

Footer (noun): An object at the bottom of the report, often showing the name of the report and the page number. The footer can be created in the Print Preview mode of DataPivot.

Gadget (noun): A window where you view and edit properties relating to any report item, Label, Label Bar, or area. The following are the gadgets found in DataPivot: Typeset, Format, Name, Formula, Display, Group and Limit.

Handle (noun): The area used to select an object. If you click and drag the handle, the object will move.

Header (noun): An object at the top of the report, often showing the name of the report. The header can be created in the Print Preview mode of DataPivot. A report design can include a header, a footer, or both.

Label (noun): In the Report, a heading for a row, column or data. The Labels in a Label Bar are extracted from a column in the Source window and represent a value that defines one item in a row of data.

Label Bar (noun): A strip of labels in the report.

Layout (noun): In DataPivot, the layout refers to the report window containing the Label Bars, Label Bar handles and the Report Data area.

Glossary

Level (noun): In DataPivot, the levels of Label Bars refer to more than one Top Label Bar or Side Label Bar. The inner levels are those Label Bars closest to the data area of the Report. The outer levels are those closest to the Top and Side borders of the Pivot window.

MIF (file type): A table file format used by Framemaker.

Operand (noun): In a formula, the number, text, reference or name on which a mathematical operation is performed.

Operator (noun): A symbol (such as -, +, *, and others) in a formula that directs DataPivot to produce a new value from existing values of operands.

Pivot (verb): To rearrange and interchange Top and Side Label Bars by clicking and dragging the handle at the end of the Label Bar and swinging it around to different positions in the report layout.

Pivot Window (noun): The window in DataPivot that contains the report.

Report (noun): The main layout that you build while using DataPivot. It contains Top Label Bar(s), Side Label Bar(s) and Report Data.

Report Data (noun): The numerical data that you extract from the Source window and place into your report. The report data area of the report is illustrated in a screen shot at the beginning of the Tutorial section of this manual.

Row (noun): A horizontal list of data.

Side Label Bar (noun): The strip of labels that span the left side of the report.

Source window (noun): The data set brought into DataPivot to be used in creating the report.

SYLK (file type): A spreadsheet file format that is created for the purpose of importing the data into other programs. This format includes information regarding the internal numbers, formats and column widths.

Tabular data (noun): Data arranged in the form of rows and columns.

DataPivot Reference & User's Guide

Template (noun): A structure that can be used again with different data. In DataPivot, the report that is created can be used again even when the data grows, shrinks or changes.

Text (file type): A file format that is created for the purpose of importing a file of information into other programs. This format usually specifies that the information be separated by either commas or tabs.

Top Label Bar (noun): The strip of labels that span the top of the report.

WKS (file type): A spreadsheet file format that is created for the purpose of importing the data into other programs. This format includes information regarding the internal numbers, formats and column widths.

Index

DataPivot Reference & User's Guide

% Increase 111
% of Column 111
% of Grand 111
% of Row 111
= DataPivot command 140
= DataPivotExit command 141
4th Dimension 14

A
Ad hoc 13
Add Computed Column 49, 101
Add Total Element 48, 69, 93
Aggregate 47
Aggregate function 158
Alignment 108
   Align Bottom 119
   Align Center 119
   Align Left 119
   Align Middle 119
   Align Right 119
   Align Top 119
Always Clear Before Load 126
Analyze 44
Average 110

B
Balloon Help 134
BIFF 76, 146, 158
Bold 119
Borland Quattro Pro 142
Brio Tools directory 23
BRIO.XLA 140
BRIO3.XLA 140
BRIO4.XLA 140
Build Menu 89
   Add Computed Column 101
   Add Total Element 93
   Focus on Labels 97
   Group Elements 94
   Hide Labels 97
   Lock Cell Sizes 100
   Make Report Data 92
   Make Side Label Bar 91
   Make Top Label Bar 90
   Page Break After 99
   Page Break Before 99
   Remove Page Break 99
   Resize All Cells to Fit 100
   Restore All Labels 98
   Restore Labels 98
   Sort Elements 96
   Ungroup Elements 95

C
Calculated Column 49
Calculated column 101
Calculation 48
Claris Hypercard 139
Clear 126
Clipboard 19, 30, 158
Close 71
Close Gadgets 116
Colors 128
Column 158
Computation 48
Computed Column 49
Concatenate 49, 158
Constrain 44
Copy 19, 30
Count 110
Create Publisher 83
Cross Tabulation 158
Custom List 114

D
Data Labels 123
Data requirements 73
Database 10, 14, 19, 72
DataPrism 14, 19, 20, 22, 62, 72
Datatype gadget 106
Date stamp 55, 57
dBase 14, 19, 72
DDE 19, 62, 138
DDEChannel 139, 141
Default List 113
Delete 39, 156
Dialog boxes 128
Display gadget 52, 107
Document Window 128, 132
Don't Save Source Data 126
Double Overline 119
Double-Click 153

Index

Draft Report 125, 156
Dynamic Data Exchange 19, 62, 138

E
Edit Menu 81
   Create Publisher 83
   Publisher Options 83
   Subscribe Options 85
   Subscribe to 84
   Undo 82
Edition 83
EIS 138
Excel 19, 72
Excel Add-In 140
EXEC command 138, 141
EXECUTE command 139
Exit 71
Export 14, 59, 76

F
File Menu 71
   Export 76
   Import 72
   Print Preview 77
   Reimport 75
File name stamp 55
FileMaker 14
Fill Down 106
Filter 44
Focus on Labels 45, 97, 115
Font gadget 53, 56, 108
Font Menu 117
Footer 56, 158
   create 78
   modify 56
Footer icon button 55
Format 18, 52
Format gadget 109
Formula 48
Formula gadget 33, 49, 92, 101, 110
Framemaker 76
Full Report 125

G
Gadget 29, 68, 104, 158
   closing 153

Gadget Menu 103
   Close Gadgets 116
   Datatype 106
      Fill Down 106
   Display 107
   Font 108
   Format 109
   Formula 110
      Operators
         % Increase 111
         % of Column 111
         % of Grand 111
         % of Row 111
         Average 110
         Count 110
         Increase 111
         Max 110
         Min 110
         String 111
         Sum 110
   Icon Bar 105
   Limit 113
      Custom List 114
      Default List 113
      Operators 114
   Name 116
Gadgets 153
Glossary 157
Group Elements 17, 28, 41, 69, 94
Group icon button 28, 41, 69, 94, 95

H
Handle 38, 158
Header 55, 158
   create 78
   modify 55
Header icon button 55
Help Menu 133
Hide Labels 45, 70, 97, 115
Hypercard 139

I
Icon Bar 27, 68, 105
Icon Buttons 26, 89
Import 14, 19, 30, 50, 72

DataPivot Reference & User's ie

Increase 111
INITIATE command 138, 141
Installation 6, 21, 23
   Macintosh 23
   Microsoft Windows 23
Introduction 5, 6
Italic 119

L

Label 123, 158
Label Bar 158
Layout 158
Level 159
Limit 17, 44
Limit gadget 28, 44, 70, 97, 113
   operators 45, 114
Load Colors 129
Lock Cell Sizes 100
Lotus 1-2-3 19, 72, 143, 146
   format 146

M

Macintosh 22, 68, 104, 127, 139
Macro 138, 140
Macro commands
   = DataPivot 140
   = DataPivotExit 141
Make Report Data 34, 69, 92
Make Side Label Bar 33, 68, 91
Make Top Label Bar 32, 68, 90
Margins 57, 80
Max 110
Messages 127
Microsoft Excel 138, 140
   EXEC command 138, 141
   EXECUTE command 139
   INITIATE command 138, 141
   TERMINATE command 139
Microsoft Windows 19, 20, 22, 30, 138
Microsoft Word 141
MIF 76, 159
Min 110
Multiple Possibilities 124

N

Name gadget 28, 42, 49, 70, 101, 116

N-dimensional 12
New 71
New Column 49
New column 101
Next Page icon button 54

O

Open 71
Open Publisher button 85
Operand 159
Operator 159
Order 153
Organization 6
Output 123
Overline 119

P

Page Break 53
Page Break After 53, 99
Page Break Before 99
Page margins 57, 80
Page number 78
Page Number stamp 55
Page Setup 71
Paradox 14
Paste 19, 30
Paste Link 30
Pivot 14, 37, 159
Pivot Window 159
Plain 119
Preferences Menu 121
   Always Clear Before Load 126
   Colors 128
      Dialog Boxes 128
      Document Windows 128
      Load 129
      Save 129
      Small Windows 128
      Status Windows 128
   Don't Save Source Data 126
   Draft Report 125
   Full Report 125
   Show "Multiple Possibilities" 124
   Side Data Labels 122
   Tear-off Icon Bar 127
   Top Data Labels 122

Index

Prerequisites 7
Previous Page icon button 54
Print 59, 71
Print Preview 54, 77
   Icon buttons 77
       Date stamp 78
       File name stamp 78
       Footer 78
       Header 77
       Next page 77
       Page number stamp 78
       Previous page 77
       Remove 78
       Time stamp 78
       Zoom 77
Print preview
   window 79
Publish 19, 83
Publisher Pptions 83

Q
Quattro Pro 142
Query tool 19, 72
Quit 71

R
Redisplay 132
Reference 7, 65
Reimport 75
Remove 28, 39, 156
Remove icon button 28, 48, 55, 70, 82, 93
Remove Page Break 53, 99
Report 159
Report Data 28, 33, 36, 159
Report Data area 35
Report Data icon button 28, 34, 69, 92
Resize All Cells to Fit 100
Resizing 152
Restore All Labels 98
Restore Labels 46, 98, 115
Row 159

S
Save 36, 71, 126
Save As 71

Save Colors 129
script 138
Scripting 137
   commands 144
      Clear 149
      Close 145
      Copy 146, 148
      Delete 146
      Export 146
      Import 148
      Move 146
      New 145
      NewColFact 147
      NewColLabel 147
      NewCompCol 148
      NewRowFact 147
      NewRowLabel 147
      Open 145
      Paste 148
      Quit 145
      Set 149
   objects
      DataPivot 145
      Limit 149
      Pivot 146
      Source 148
   syntax 144
Selecting
   columns vs. rows 152
   data with label 152
   multiple objects 152
Short-cuts 151
Show "Multiple Possibilities" 124
Show Values button 44
Side Data Labels 122
Side Label Bar 27, 32, 35, 36, 37, 68, 159
Side Labels 14
Side Labels icon button 27, 33, 37, 68, 91, 156
Small Windows 128
Sort 17, 153
Sort Elements 96
Source data 17
Source Window 132

Source window 27, 28, 29, 159
Source window icon button 29, 70, 132
Spreadbase 19, 72
Spreadsheet 14, 19, 72, 76
Status Windows 127, 128
String 111, 124
Style Menu 119
   Align Bottom 119
   Align Center 119
   Align Left 119
   Align Middle 119
   Align Right 119
   Align Top 119
   Bold 119
   Double Overline 119
   Italic 119
   Overline 119
   Plain 119
   Underline 119
Subscribe 19, 30, 61, 83
Subscribe options 85
Subscribe to 84
Subtotal 47
Subtotals 16
Sum 47, 110
Summary 47
Suppress Data Label Output 123
SYLK 19, 72, 76, 146, 159
System 7 19, 30, 60, 83, 134
System Requirements 22
   Macintosh 22
   Microsoft Windows 22

T
Tabular data 10, 159
Tear-off Icon Bar 68, 104, 127
Template 36, 160
TERMINATE command 139
Text 160
   comma delimited 19, 72, 76, 146
   tab delimited 19, 72, 76, 146
Time stamp 55
Top Data Labels 122
Top Label Bar 27, 35, 36, 37, 41, 48, 68, 160
Top Labels 14, 27
Top Labels icon button 27, 32, 68, 90, 156

Total 47
Total icon button 28, 47, 48, 69, 93
Totals 16, 156
Troubleshooting 155
Tutorial 7, 25

U
Underline 119
Undo 82
Ungroup 17, 42
Ungroup Elements 42, 69, 95

W
Window Menu 131
   Document Window 132
   Redisplay 132
   Source Window 132
Windows Help System 135
WK1 19, 72
WK2 19, 72
WKS 19, 72, 76, 146, 160
Word processor 72

X
XLS 146

Z
Zoom icon button 55

What is claimed is:

1. A method of cross-tabulating a plurality of source data records within a computer system into an initial cross-tab rectilinear displayed report including one or more top labels and one or more side labels, whereby the top labels and the side labels may be re-arranged and interchanged to form a second differently structured report, without reaccessing the source data records, the method comprising the steps of:

a. receiving a plurality of source data records including a plurality of fields and corresponding values;
   b. forming a tree-type data structure from the plurality of source data records including one or more side label levels and one or more top label levels, wherein each of the one or more side label levels and each of the one or more top label levels include a plurality of nodes and a plurality of cells, wherein an appropriate aggregate value of a fact supported by the tree-type data structure is stored in each of the plurality of cells so that as additional data records within the plurality of source data records are received the corresponding values are added to the appropriate aggregate value; and
   c. forming an initial cross-tab rectilinear displayed report from the cells within the tree-type data structure formed with the top label levels on a top of the report and the side label levels on a side of the report with corresponding aggregate values displayed within the report; wherein one of the second differently structured reports is formed by rearranging one of the one or more side label levels and top label levels thereby changing relationships between the nodes within the tree-type data structure without reaccessing the source data records and forming newly corresponding aggregate values for display within the report.

2. The method as claimed in claim 1 wherein the initial cross-tab rectilinear displayed report includes a z-label and the tree-type data structure includes a z-label level.

3. The method as claimed in claim 2 wherein the initial rectilinear displayed report includes one or more additional labels and the tree-type data structure includes one or more additional label levels.

4. The method as claimed in claim 1 wherein the plurality of source data records are received sequentially and the corresponding values added to the appropriate aggregate value without simultaneously storing all of the plurality of source data records into a memory of the computer.

5. The method as claimed in claim 4 further comprising the step of forming a cross tree-type data structure which corresponds to the tree-type data structure, but includes only the one or more top label levels and corresponding nodes and cells.

6. The method as claimed in claim 1 wherein the step of rearranging one of the one or more side label levels and top label levels is completed by modifying the tree-type data structure.

7. The method as claimed in claim 1 wherein the step of rearranging one of the one or more side label levels and top level labels is completed by moving and switching the one or more side label levels and the top label levels in relation to each other within the tree-type data structure.

8. A computer system for converting a first cross-tabulated report representative of a first plurality of source data records including one or more first labels and one or more second labels, whereby the first labels and the second labels can be rearranged and interchanged to form a second differently structured report, the computer system comprising:

a. means for receiving a first plurality of source data records including a second plurality of fields and corresponding values;
   b. first means for forming a data structure representative of the first plurality of source data records coupled to the means for receiving, the data structure including one or more first label structures and second label structures and a second plurality of aggregate values representative of the data within the first plurality of source data records;
   c. second means for forming an initial cross-tabulated report coupled to receive the data structure, the initial cross-tabulated report having the first label structures, if present, on a first coordinate of the initial report and the second label structures, if present, on a second coordinate of the initial report with corresponding aggregate values of the second plurality of aggregate values displayed within the report; and
   d. means for rearranging and interchanging the first label structures and the second label structures within the data structure including means for forming newly corresponding aggregate values for display within the report without reaccessing the source data records, the means for rearranging and interchanging coupled to the first and the second means for forming.

9. The computer system as claimed in claim 8 wherein the data structure is a tree-type data structure.

10. The computer system as claimed in claim 9 wherein the tree-type data structure includes a third plurality of nodes and a third plurality of cells.

11. The computer system as claimed in claim 10 wherein one of the second plurality of aggregate values is stored within a corresponding one of the third plurality of cells.

12. The computer system as claimed in claim 9 wherein the first label structures are top label structures and the second label structures are side label structures.

13. The computer system as claimed in claim 12 further comprising a cross tree-type data structure which corresponds to the tree-type data structure, but includes only the one or more top label structures and corresponding nodes and cells.

14. The computer system as claimed in claim 13 wherein the means for rearranging and interchanging forms the second differently structured report by modifying the tree-type data structure.

15. The computer system as claimed in claim 13 wherein the means for rearranging and interchanging forms the second differently structured report by moving and switching the one or more side label structures and the top label structures in relation to each other within the tree-type data structure.

16. The computer system as claimed in claim 9 wherein the initial cross-tabulated report includes one or more additional labels and the tree-type data structure includes one or more additional label structures.

17. The computer system as claimed in claim 8 wherein the data structure is a matrix data structure.

18. The computer system as claimed in claim 8 wherein the initial cross-tabulated report includes one or more additional labels and the tree-type data structure includes one or more additional label structures.

19. The computer system as claimed in claim 8 wherein the first plurality of data records are received sequentially and the corresponding values are added to an appropriate aggregate value without simultaneously storing all of the first plurality of source data records into a memory of the computer system.

* * * * *

UNITED STATES PATENT AND TRADEMARK OFFICE
CERTIFICATE OF CORRECTION

PATENT NO.: 5,915,257

DATED: June 22, 1999

INVENTOR(S): Daniel L. Gartung *et al.*

It is certified that error appears in the above-identified patent and that said Letters Patent is hereby correct as shown below:

ON THE TITLE PAGE:

Item [54]  In the Title, delete "CROSS TAB ANALYSIS AND REPORTING METHOD" AND INSERT --CROSS TABULATION ANALYSIS AND REPORTING USING TREE STRUCTURE AND AGGREGATE DATA--.

Item [56]  References Cited

U.S. PATENT DOCUMENTS

Insert the following:

| | | | | |
|---|---|---|---|---|
| -- | 5,421,008 | 5/1995 | Banning et al. | 395/600 |
| | 5,440,730 | 8/1995 | Elmasri et al. | 395/600 |
| | 5,442,786 | 8/1995 | Bowen | 395/600 |
| | 5,446,886 | 8/1995 | Li | 395/600 |
| | 5,446,886 | 11/1995 | McGregor | 395/600-- |

OTHER PUBLICATIONS

Insert the following:

-- Brio, DataPivot Reference and User Guide, Version 1.5, 1993.
Borland, Quattro Pro for Windows 5.0 User Manual, 1993, pp. 219-220, 230-231 and 371-409.
Knuth, The Art of Computer Programming, Vol. 1, Fundamental Algorithms, 1973, pp. 305-310, 332-336 and 347-350.
Celko, DataPivot 1.1, DBMS v. 6, n. 1, p. 30(2), Jan. 1993.
Benjamin, DataPivot, MacUser, v. 8, n. 5, p. 46(2), May 1992.
Staff, Swinging Data, MacUser, v. 8, n. 2, p. 44, Feb. 1992.
Sullivan, Analytical Ability Marks QP/W Upgrade, PC Week, v. 10, n. 23, p. 1(2), Jun. 1993.
Spector, Forest & Trees Reads More Data, PC World, v. 11, n. 2, p. 98, Feb. 1993.--

UNITED STATES PATENT AND TRADEMARK OFFICE
CERTIFICATE OF CORRECTION

PATENT NO.:     5,915,257                    PAGE 2 OF 2

DATED:          June 22, 1999

INVENTOR(S):    Daniel L. Gartung *et al.*

It is certified that error appears in the above-identified patent and that said Letters Patent is hereby correct as shown below:

IN THE SPECIFICATION:
　　In Col. 1, lines 1-2, delete "CROSS TAB ANALYSIS AND REPORTING METHOD" and insert --CROSS TABULATION ANALYSIS AND REPORTING USING TREE STRUCTURE AND AGGREGATE DATA--; and lines 50-53, delete "The DataPivot Reference and User's Guide published by Brio Technology, Inc. of 444 Castro Street, Suite 700, Mountain View, Calif. is attached hereto as Appendix C."
　　In Col. 5-6, Report 2, line 7, replace "2266" with --2286--; and line 11, replace "2290" with --2280--.
　　In Col. 10, line 31, delete "draw" and insert --drawn--.
　　In Col. 11, line 9, delete "351" and insert -- 350--; and line 10, delete "351" and insert --350--.
　　In Col. 12, line 4, insert a comma --,-- between "read" and "the".
　　In Col. 13, line 14, delete "spawncount" and insert --spawnCount--; line 15, delete "spawncount" and insert --spawnCount--; line 32, delete "spawncount-1," and insert --spawnCount-1,--; line 37, delete "spawncount-1." and insert --spawnCount-1.--; line 53, delete "spawncount-1" and insert --spawnCount-1--; and line 55, delete "spawncount-1" and insert --spawnCount-1--.
　　In Col. 14, line 6, delete "spawncount" and insert --spawnCount--; and line 22, delete "spawnarrh[i]" and insert --spawnArrh[i]--.
　　In Col. 19-164, delete the "DataPivot Reference and User's Guide" in its entirety.

Signed and Sealed this

Sixteenth Day of May, 2000

*Attest:*

*Attesting Officer*

Q. TODD DICKINSON
*Director of Patents and Trademarks*